(12) United States Patent
Yahata et al.

(10) Patent No.: US 12,189,680 B2
(45) Date of Patent: Jan. 7, 2025

(54) CONTENT MANAGEMENT DEVICE, CONTENT MANAGEMENT SYSTEM, AND CONTROL METHOD

(71) Applicant: PANASONIC INTELLECTUAL PROPERTY MANAGEMENT CO., LTD., Osaka (JP)

(72) Inventors: Hiroshi Yahata, Osaka (JP); Seigo Takahashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 17 days.

(21) Appl. No.: 17/684,962

(22) Filed: Mar. 2, 2022

(65) Prior Publication Data

US 2022/0188348 A1 Jun. 16, 2022

Related U.S. Application Data

(63) Continuation of application No. 16/489,990, filed as application No. PCT/JP2018/036730 on Oct. 1, 2018, now Pat. No. 11,301,512.

(30) Foreign Application Priority Data

Oct. 24, 2017 (JP) ................. 2017-204862

(51) Int. Cl.
*G06F 16/587* (2019.01)
*G06F 16/51* (2019.01)
(Continued)

(52) U.S. Cl.
CPC ............ *G06F 16/587* (2019.01); *G06F 16/51* (2019.01); *G06F 16/535* (2019.01); *G06F 16/55* (2019.01);
(Continued)

(58) Field of Classification Search
CPC ............ G06F 21/6209; G06F 21/6218; G06F 16/587; G06F 16/55; G06F 16/583; G06F 16/51; G06F 16/535

See application file for complete search history.

(56) References Cited

U.S. PATENT DOCUMENTS 7,822,744 B2 * 10/2010 Isomura ................. G06T 11/60
707/731
8,811,775 B1 * 8/2014 Chao .................... G06F 3/04817
382/307

(Continued)

FOREIGN PATENT DOCUMENTS

JP 2002-191015 A 7/2002
JP 3633463 B2 3/2005

(Continued)

OTHER PUBLICATIONS

International Search Report and Written Opinion issued on Dec. 25, 2018 in International Application No. PCT/JP2018/036730; with partial English translation.

(Continued)

*Primary Examiner* — Vance M Little
(74) *Attorney, Agent, or Firm* — Rimon P.C.

(57) ABSTRACT

A content management device includes: a storage that stores (a) a content generated by imaging performed by a first terminal that is at least one of a plurality of terminals, (b) a time at which the imaging of the content was performed, and (c) a history indicating whether each of one or more terminals among the plurality of terminals excluding a second terminal received, during a period that includes the time at which the imaging was performed, a beacon signal transmitted from the second terminal by radio waves, the second terminal being at least one of the plurality of terminals; and a manager that manages the content as a permissible content that is permitted to be presented by the plurality of terminals (Continued)

(a)

| DISTANCE FROM HOUSE | ADDRESS REPRESENTATION LEVEL | EXAMPLE |
|---|---|---|
| CLOSE (- 10 Km) | DETAILED | WARD |
| INTERMEDIATE (10 Km - 100 Km) | INTERMEDIATE | CITY/TOWN/VILLAGE |
| FAR (100 Km -) | ROUGH | PREFECTURE, COUNTY |

(b)

| DISTANCE FROM HOUSE | NAME RECOGNITION OR NUMBER OF VISITS | ADDRESS REPRESENTATION LEVEL | EXAMPLE |
|---|---|---|---|
| CLOSE | LOW OR LOW NUMBER OF VISITS | 4 (SLIGHTLY ROUGH) | CITY/TOWN/VILLAGE, PREFECTURE |
| | HIGH OR HIGH NUMBER OF VISITS | 1 (MOST DETAILED) | WARD, CITY/TOWN/VILLAGE |
| INTERMEDIATE | LOW OR LOW NUMBER OF VISITS | 5 (ROUGH) | PREFECTURE, COUNTY |
| | HIGH OR HIGH NUMBER OF VISITS | 2 (DETAILED) | CITY/TOWN/VILLAGE, PREFECTURE, COUNTY |
| FAR | LOW OR LOW NUMBER OF VISITS | 6 (ROUGHEST) | PREFECTURE, COUNTY |
| | HIGH OR HIGH NUMBER OF VISITS | 3 (SLIGHTLY DETAILED) | CITY/TOWN/VILLAGE, PREFECTURE, COUNTY | when determining, with reference to the storage, that each of the one or more terminals received the beacon signal during the period.

10 Claims, 16 Drawing Sheets

(51) Int. Cl.
    *G06F 16/535*     (2019.01)
    *G06F 16/55*     (2019.01)
    *G06F 16/583*     (2019.01)
    *G06F 21/62*     (2013.01)

(52) U.S. Cl.
    CPC ........ *G06F 16/583* (2019.01); *G06F 21/6209* (2013.01); *G06F 21/6218* (2013.01)

(56) References Cited

U.S. PATENT DOCUMENTS

| | | |
|---|---|---|
| 2002/0039203 A1 | 4/2002 | Endo et al. |
| 2005/0128305 A1 | 6/2005 | Hamasaki et al. |
| 2006/0192862 A1 | 8/2006 | Ono et al. |
| 2007/0065044 A1* | 3/2007 | Park .................. G06F 16/583 707/E17.02 |
| 2007/0115373 A1* | 5/2007 | Gallagher .............. G06V 20/00 707/E17.023 |
| 2007/0127833 A1* | 6/2007 | Singh .................... G06F 16/48 382/254 |
| 2007/0185980 A1 | 8/2007 | Abraham et al. |
| 2007/0220045 A1 | 9/2007 | Morris et al. |
| 2009/0279794 A1* | 11/2009 | Brucher ................ G06F 16/58 382/225 |
| 2010/0284566 A1 | 11/2010 | Hisatomi et al. |
| 2011/0066588 A1* | 3/2011 | Xie .......................... G06N 5/02 348/231.5 |
| 2011/0075891 A1* | 3/2011 | Yokoyama ............. G06F 16/78 382/115 |
| 2012/0066309 A1 | 3/2012 | Yuki et al. |
| 2013/0339358 A1 | 12/2013 | Huibers et al. |
| 2014/0218242 A1* | 8/2014 | Platzer ................. G01S 5/0027 342/454 |
| 2016/0117347 A1* | 4/2016 | Nielsen ............... G06F 16/9024 707/738 |
| 2017/0026528 A1* | 1/2017 | Kim .................. H04N 1/00453 |
| 2017/0068857 A1 | 3/2017 | Lee et al. |
| 2017/0300926 A1 | 10/2017 | Stout |
| 2017/0329677 A1* | 11/2017 | Crofton ............... H04L 67/1095 |

FOREIGN PATENT DOCUMENTS

| | | |
|---|---|---|
| JP | 2005-174060 A | 6/2005 |
| JP | 2010-113390 A | 5/2010 |
| JP | 2010-145087 A | 7/2010 |
| JP | 2013-045302 A | 3/2013 |
| JP | 2014-048534 A | 3/2014 |
| JP | 2014-145932 A | 8/2014 |
| JP | 2016-001405 A | 1/2016 |
| WO | 2007/013432 A1 | 2/2007 |
| WO | 2011/114634 A1 | 9/2011 |
| WO | 2018/179604 A1 | 10/2018 |

OTHER PUBLICATIONS

Supplementary European Search Report dated on Oct. 14, 2020 issued in European patent application No. 18871461.2.
Extended European Search Report dated on Dec. 16, 2020 issued in the corresponding European Patent Application No. 18871461.2.
Non-Final Office Action issued in U.S. Appl. No. 16/489,990 dated Apr. 9, 2021.
Final Office Action issued in U.S. Appl. No. 16/489,990 dated Jul. 19, 2021.
Notice of Allowance issued in U.S. Appl. No. 16/489,990 dated Dec. 17, 2021.

* cited by examiner

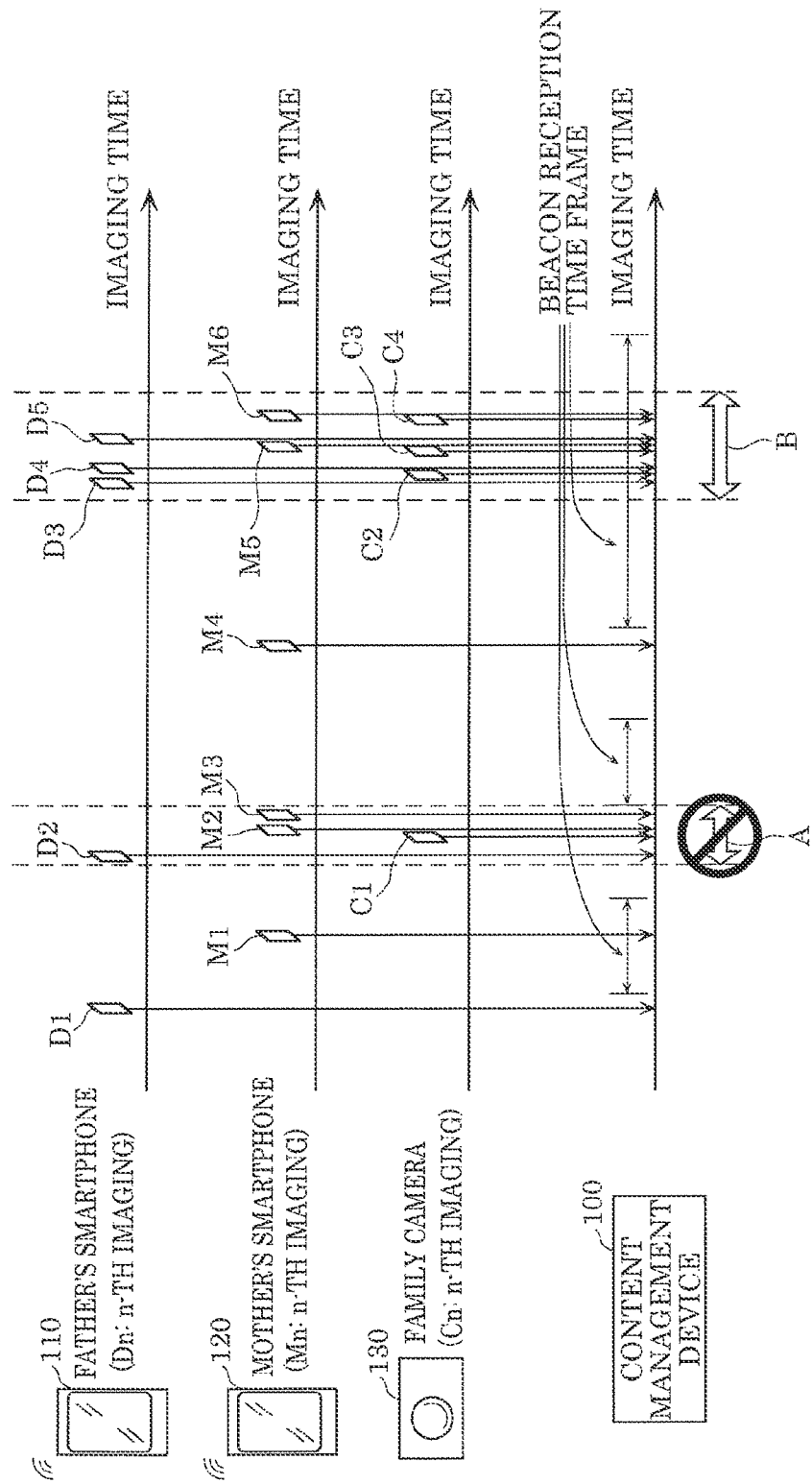

FIG. 7B
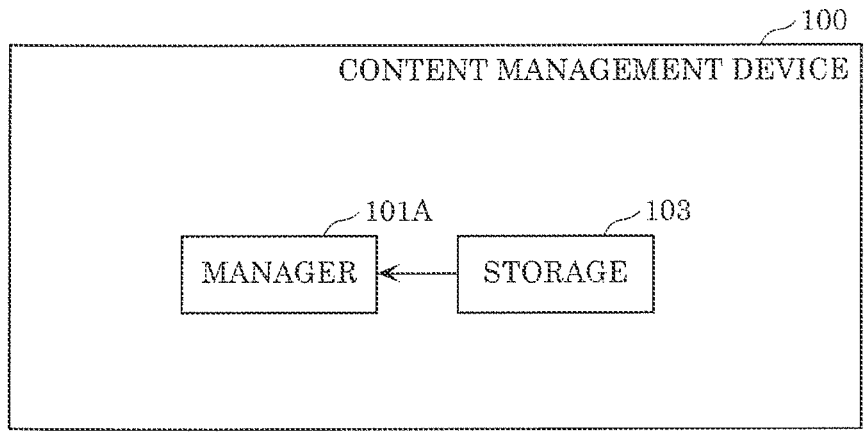
FIG. 7C
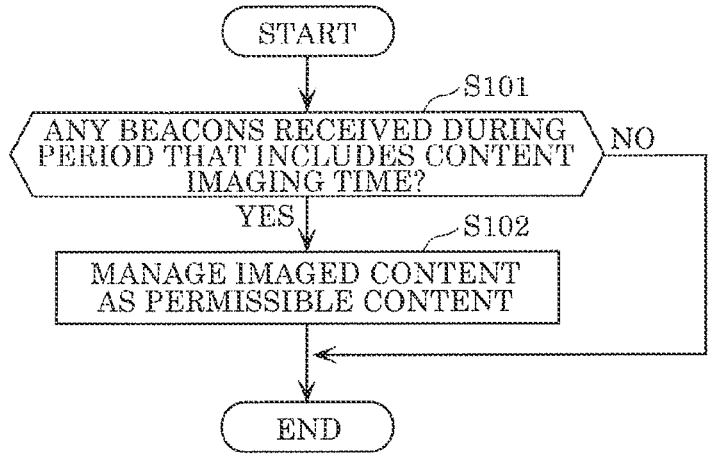
FIG. 7D
|  |  | BEACON TRANSMITTER | | | | | |
|---|---|---|---|---|---|---|---|
|  |  | TERMINAL 1 | TERMINAL 2 | TERMINAL 3 | TERMINAL 4 | TERMINAL 5 | TERMINAL 6 |
| BEACON RECEIVER | TERMINAL 1 | – |  | ○ |  |  |  |
|  | TERMINAL 2 | ○ | – |  |  |  |  |
|  | TERMINAL 3 | ○ |  | – |  |  |  |
|  | TERMINAL 4 |  | ○ |  | – |  |  |
|  | TERMINAL 5 |  |  |  |  | – |  |
|  | TERMINAL 6 |  |  |  |  |  | – |

| DISTANCE FROM HOUSE | ADDRESS REPRESENTATION LEVEL | EXAMPLE |
|---|---|---|
| CLOSE (- 10 Km) | DETAILED | WARD |
| INTERMEDIATE (10 Km - 100 Km) | INTERMEDIATE | CITY/TOWN/VILLAGE |
| FAR (100 Km -) | ROUGH | PREFECTURE, COUNTY |

(b)

| DISTANCE FROM HOUSE | NAME RECOGNITION OR NUMBER OF VISITS | ADDRESS REPRESENTATION LEVEL | EXAMPLE |
|---|---|---|---|
| CLOSE | LOW OR LOW NUMBER OF VISITS | 4 (SLIGHTLY ROUGH) | CITY/TOWN/VILLAGE, PREFECTURE |
| | HIGH OR HIGH NUMBER OF VISITS | 1 (MOST DETAILED) | WARD, CITY/TOWN/VILLAGE |
| INTERMEDIATE | LOW OR LOW NUMBER OF VISITS | 5 (ROUGH) | PREFECTURE, COUNTY |
| | HIGH OR HIGH NUMBER OF VISITS | 2 (DETAILED) | CITY/TOWN/VILLAGE, PREFECTURE, COUNTY |
| FAR | LOW OR LOW NUMBER OF VISITS | 6 (ROUGHEST) | PREFECTURE, COUNTY |
| | HIGH OR HIGH NUMBER OF VISITS | 3 (SLIGHTLY DETAILED) | CITY/TOWN/VILLAGE, PREFECTURE, COUNTY |

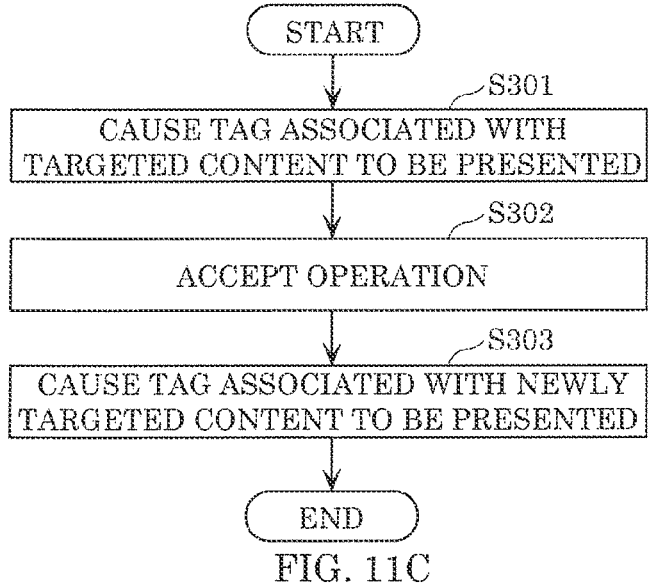
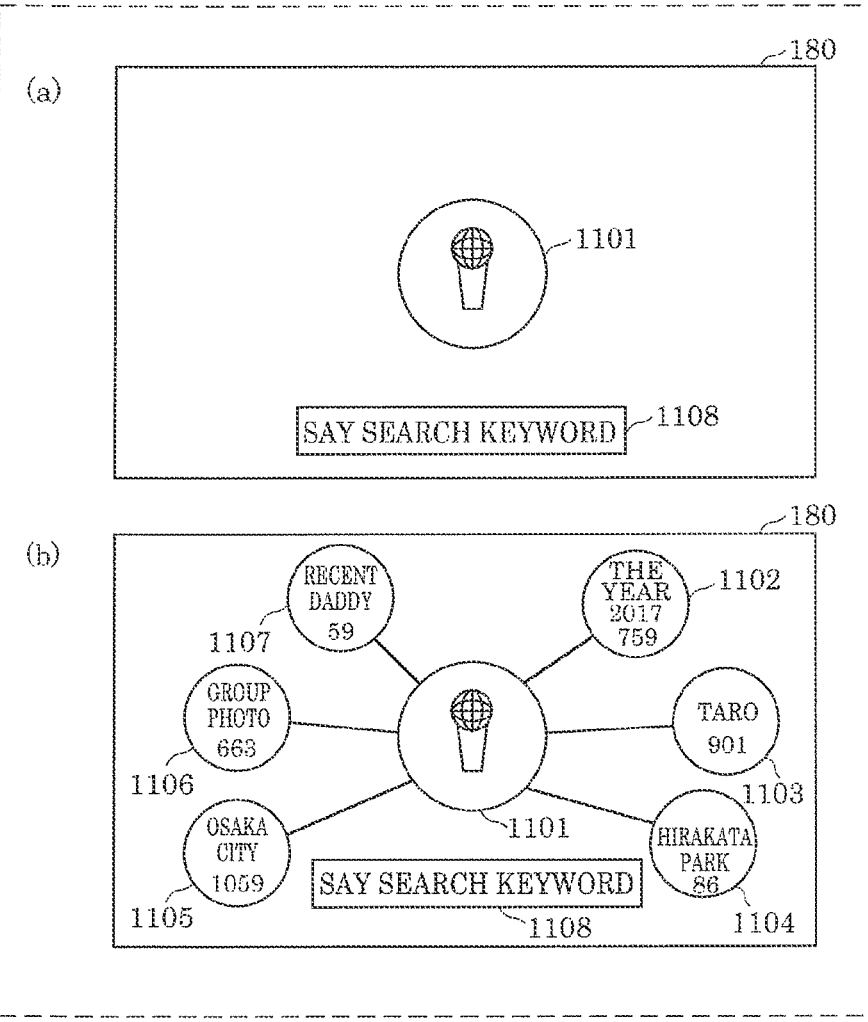

CONTENT MANAGEMENT DEVICE, CONTENT MANAGEMENT SYSTEM, AND CONTROL METHOD

CROSS-REFERENCE OF RELATED APPLICATIONS

This application is a Continuation of U.S. patent application Ser. No. 16/489,990, filed on Aug. 29, 2019, which is a U.S. National Phase under 35 U.S.C. § 371 of International Patent Application No. PCT/JP2018/036730, filed on Oct. 1, 2018, which in turn claims the benefit of Japanese Application No. 2017-204862, filed on Oct. 24, 2017, the entire disclosures of which Applications are incorporated by reference herein.

TECHNICAL FIELD

The present disclosure relates to a device that accumulates contents such as pictures and moving images imaged by an individual, and categorizes and displays such contents in an easy-to-understand manner, and to a content display method for use in such device.

BACKGROUND ART

Conventional content management devices include a content management device that copies and stores videos imaged by a digital still camera, a video camera, a smartphone, etc. onto a hard disk drive (HDD), etc. from a plurality of devices by use of a recording card, a USB memory, Wi-Fi®, etc., and categorizes such videos to present them to a viewer. Videos are categorized, for example, in chronological order of imaging, or on the basis of a subject identified by image recognition. Content management devices have been commercialized as apparatuses or applications.

Such devices place the collected and stored videos on a calendar or a map displayed on a screen display, thereby providing a function of enabling easy access to relevant videos in accordance with the imaging dates/times or locations.

Also, the recent progress in the image recognition technologies has enabled video management on a smartphone, a personal computer, and a cloud server by organizing videos on the basis of the faces of family members. Stated differently, such progress has enabled the video management not on the basis of the dates or locations but through the identification of persons imaged as subjects and also as highly abstracted subjects in the videos.

A known related art for address display of the imaging locations of images enables an easy-to-understand navigation in a car navigation system by changing address granularities, etc. between regular, familiar roads and unfamiliar roads (see PTL 1).

CITATION LIST

Patent Literature

PTL 1: Japanese Unexamined Patent Application Publication No. 2010-145087
PTL 2: Japanese Unexamined Patent Application Publication No. 2014-48534
PTL 3: Japanese Unexamined Patent Application Publication No. 2014-145932

SUMMARY OF THE INVENTION

Technical Problem

When contents are transmitted between family members, however, the system with the above configuration poses concerns about privacy/confidentiality and operability that is required in viewing an enormous amount of contents.

In view of the above, the present disclosure aims to provide a content management device that can effectively solve the concerns about privacy/confidentiality and operability for content viewing.

Solutions to Problem

The content management device according to the present disclosure includes: a storage that stores (a) a content generated by imaging performed by a first terminal that is at least one of a plurality of terminals, (b) a time at which the imaging of the content was performed, and (c) a history indicating whether each of one or more terminals among the plurality of terminals excluding a second terminal received, during a period that includes the time at which the imaging was performed, a beacon signal transmitted from the second terminal by radio waves, the second terminal being at least one of the plurality of terminals; and a manager that manages the content as a permissible content that is permitted to be presented by the plurality of terminals when determining, with reference to the storage, that each of the one or more terminals received the beacon signal during the period.

Such content management device manages, as a permissible content that can be presented by a plurality of terminals, a content that was imaged when such plurality of terminals were within a distance in which the transmission of a radio wave beacon signal was possible between the terminals. When a plurality of terminals are within such distance, the owners of the respective terminals are participating in the same event. The contents imaged by such terminals are already shared between the owners of the terminals, and thus privacy or confidentiality is not likely to be lost even when the contents are presented to the owners of the respective terminals.

The above content management device is thus capable of managing contents such as videos collected from imaging devices being the plurality of terminals, without causing a privacy problem of the owners of the contents or persons who imaged the contents, etc. Note that management also means control that is preformed to output videos to or outside of a group including the owners of the videos or the persons who imaged the videos, and other users, or to display or record such videos. Also note that videos also means still images such as pictures, or moving images.

The second terminal may transmit the beacon signal at a predetermined time that is repeatedly set, each of the one or more terminals may enter a standby state for receiving the beacon signal during a reception standby period that includes the predetermined time, and the storage may store the history indicating whether each of the one or more terminals received the beacon signal during the reception standby period.

In the above configuration, the terminals wait for beacon reception only when a beacon signal is transmitted from another terminal. Stated differently, the terminals do not have to wait for beacon reception in the other period. This enables the terminals to stop a current that is supplied to a reception circuit to wait for beacon reception when no beacon signal is transmitted from another terminal, thereby reducing power consumption.

The manager, when the content is one of a plurality of contents generated by the plurality of terminals, may divide the plurality of contents into a plurality of groups in accordance with a non-imaging period. Here, each of the plurality of groups includes a predetermined or greater number of contents, and the non-imaging period is a period that is longer than a predetermined time length among periods between which the plurality of contents were imaged. The manager may manage the predetermined or greater number of contents included in each of the plurality of groups as permissible contents that are permitted to be presented by the plurality of terminals when determining that each of the one or more terminals received the beacon signal during a period in which the predetermined or greater number of contents included in each of the plurality of groups were imaged. Here, the predetermined time length may be longer as a distance between an imaging location of one of the plurality of contents and a house of a user of the plurality of terminals is greater, and one of the plurality of contents is a content that was imaged immediately before or after the period in which the predetermined or greater number of contents included in each of the plurality of groups were imaged.

When grouping a plurality of contents on the basis of the imaging times, such content management device is capable of setting the time length of a non-imaging period used to group the contents in accordance with the distance between the imaging location of such contents and the location of the user's house, and thus grouping the contents appropriately. This enables the content management device to appropriately group the contents without requiring the user to explicitly set the time length of the non-imaging period, and thus to manage the contents while maintaining the privacy or confidentiality of the contents.

Also, a content management device according to the present disclosure includes: a storage that stores a plurality of contents, and an imaging location of each of the plurality of contents; and a manager that determines a character string indicating an area classification concerning the plurality of contents. In this content management device, the manager determines the character string indicating the area classification that covers a wider area as a distance between an imaging location of a representative content among the plurality of contents and a house of a user is greater. Here, the area classification includes the imaging location of the representative content.

When automatically creating a digest version moving image in which a plurality of contents are collected as a user-recallable single event in the past, such content management device appropriately determines an appropriate character string that represents the digest version moving image to be created, in accordance with the imaging location of the contents. The determined character string can be used, for example, as an opening caption of the digest version moving image, or a part of the name of the digest version moving image file. This enables the content management device to set an appropriate character string to the digest version moving image on the basis of the imaging location of the contents, without requiring the user to explicitly set an appropriate character string.

The manager may further determine the character string indicating the area classification that covers a smaller area as name recognition of the imaging location of the representative content among the plurality of contents is higher, or determine the character string indicating the area classification that covers a smaller area as a total number of times the user has visited the imaging location of the representative content among the plurality of contents is higher. Here, the area classification includes the imaging location of the representative content.

Such content management device can easily determine an appropriate character string relating the digest version moving image on the basis of the name recognition of the imaging location of the contents, or the number of times the user has visited the imaging location of the contents. This enables the content management device to set an appropriate character string that represents the digest version moving image, on the basis of the name recognition of the imaging location of the contents or the number of visits, without requiring the user to explicitly set an appropriate character string.

Also, a content management device according to the present disclosure includes: a storage that stores a plurality of contents, and at least one tag associated with each of the plurality of contents; a presentation controller that causes a presentation unit to present at least one tag associated with a targeted content among the plurality of contents, the targeted content being a target of a search; an acceptor that accepts an operation of a user on the at least one tag caused to be presented by the presentation controller; and a manager that causes the presentation unit to present at least one tag associated with at least one content serving as a new target of the search when the acceptor has accepted the operation. Here, the at least one content is retrieved by the search of the plurality of contents with details of a targeted tag used as a search criterion, the targeted tag being a target of the operation.

Such content management device facilitates a user selection of a tag by presenting tags usable as search criteria to the user, when the user wishes to extract a desired content from the plurality of contents.

The manager may further cause the presentation unit to present information for accepting an operation for content playback when a total number of the at least one content to be presented by the presentation unit is a predetermined or smaller number.

Such content management device presents information for accepting an operation for content playback at a point in time when the number of contents matching the search criteria reaches the number of contents that the user can view within a realistic time period. The presentation of such information enables the user to better recognize that the content management device is ready to accept an operation for playback, and thus to perform an operation for playback as necessary. The content management device better avoids accepting an operation for content viewing when a content to be presented that matches the search criteria requires an unrealistically long hours for viewing. The presentation of an appropriate number of contents to the user enhances the operability of content viewing.

The manager may further cause the presentation unit to present information for accepting an operation to reduce a total number of search criteria concerning the at least one content to be presented by the presentation unit when the total number of search criteria is a predetermined or greater number.

Such content management device presents information for accepting an operation to reduce the number of search criteria at a point in time when a relatively large number of search criteria is presented. The presentation of such information enables the user to recognize that an operation to reduce the number of search criteria is ready to be accepted, and thus to perform an operation to reduce the number of search criteria as necessary. The content management device is capable of reducing the number of search criteria on the basis of a user operation to enable the user to quickly search for a content, thereby enhancing the operability of content viewing even if an enormous number of contents are presented.

Also, a content management system according to the present disclosure includes: a plurality of terminals; and a content management device that manages contents generated by the plurality of terminals, the content management device being connected to the plurality of terminals. In this content management system, each of the plurality of terminals transmits and receives corresponding ones of the contents generated, and a beacon signal that utilizes radio waves, and the content management device includes: a storage that stores (a) a content generated by a first terminal that is one of the plurality of terminals, (b) a time at which the content was generated, and (c) information indicating whether a terminal among the plurality of terminals excluding the first terminal succeeded or failed to receive, during a period that includes the time, the beacon signal transmitted from the first terminal among the plurality of terminals; and a manager that permits the terminal to present the content generated by the first terminal. Here, the terminal is a terminal that is different from the first terminal among the plurality of terminals and that succeeded in receiving the beacon signal transmitted from the first terminal during a time frame that includes the time at which the content was generated.

This configuration achieves the same effects as those of the content management device described above.

The manager may further permit a second terminal to present the content generated by the first terminal. Here, the second terminal is a terminal that transmitted a beacon that the first terminal succeeded in receiving during the time frame.

This configuration enables the content management system to more easily determine a terminal to which content viewing is permitted on the basis of whether such terminal has succeeded in beacon reception.

The manager may further permit a third terminal to present the content generated by the first terminal, Here, the third terminal is a terminal that succeeded in one of beacon transmission and beacon reception performed with the second terminal during the time frame.

This configuration enables the content management system to more easily determine a terminal to which content viewing is permitted on the basis of whether such terminal has succeeded in one of beacon transmission and beacon reception.

A control method for use in a content management device according to the present disclosure includes: identifying whether each of one or more terminals among a plurality of terminals received a beacon signal during a period with reference to a storage that stores (a) a content generated by imaging performed by a first terminal that is at least one of the plurality of terminals, (b) a time at which the imaging of the content was performed, and (c) a history indicating whether each of one or more terminals among the plurality of terminals excluding a second terminal received, during the period that includes the time at which the imaging was performed, the beacon signal transmitted from the second terminal by radio waves, the second terminal being at least one of the plurality of terminals; and managing the content as a permissible content that is permitted to be presented by the plurality of terminals when it is identified in the identifying that each of the one or more terminals received the beacon signal during the period.

This configuration achieves the same effects as those of the content management device described above.

A control method for use in a content management device according to the present disclosure includes: obtaining a plurality of contents and an imaging location of each of the plurality of contents from a storage that stores the plurality of contents and the imaging location of each of the plurality of contents; and determining a character string indicating an area classification concerning the plurality of contents, with reference to the plurality of contents and the imaging location of each of the plurality of contents obtained in the obtaining. In the determining, the character string is determined that indicates the area classification covering a wider area as a distance between an imaging location of a representative content among the plurality of contents and a house of a user is greater, Here, the area classification includes the imaging location of the representative content.

This configuration achieves the same effects as those of the content management device described above.

A control method for use in a content management device according to the present disclosure includes: causing a presentation unit to present at least one tag associated with a targeted content among a plurality of contents, with reference to a storage that stores the plurality of contents and at least one tag associated with each of the plurality of contents, the targeted content being a target of a search; accepting an operation of a user on the at least one tag caused to be presented; and causing the presentation unit to present at least one tag associated with at least one content serving as a new target of the search when the operation is accepted in the accepting. Here, the at least one content is retrieved by the search of the plurality of contents with details of a targeted tag used as a search criterion, the targeted tag being a target of the operation.

This configuration achieves the same effects as those of the content management device described above.

Advantageous Effect of Invention

The content management device according to the present disclosure is capable of effectively solving the concerns about privacy/confidentiality and operability for content viewing.

BRIEF DESCRIPTION OF DRAWINGS

FIG. 7A is a diagram that illustrates a method of identifying a family event performed by the content management device according to Variation 3 of Embodiment 1.

FIG. 7B is a diagram that illustrates the configuration of the content management device according to Variation 3 of Embodiment 1.

FIG. 7C is a flowchart of a control method for use in the content management device according to Variation 3 of Embodiment 1.

FIG. 7D is a diagram that illustrates an example of beacon reception by terminals according to Variation 3 of Embodiment 1.

FIG. 9 is a diagram that illustrates a table indicating the criteria of address representation levels according to Embodiment 2.

FIG. 11B is a flowchart of a control method for use in the content management device according to Embodiment 3.

FIG. 11C is a diagram that illustrates a first example of displaying an operation screen according to Embodiment 3.

DESCRIPTION OF EXEMPLARY EMBODIMENTS

Figure 1:
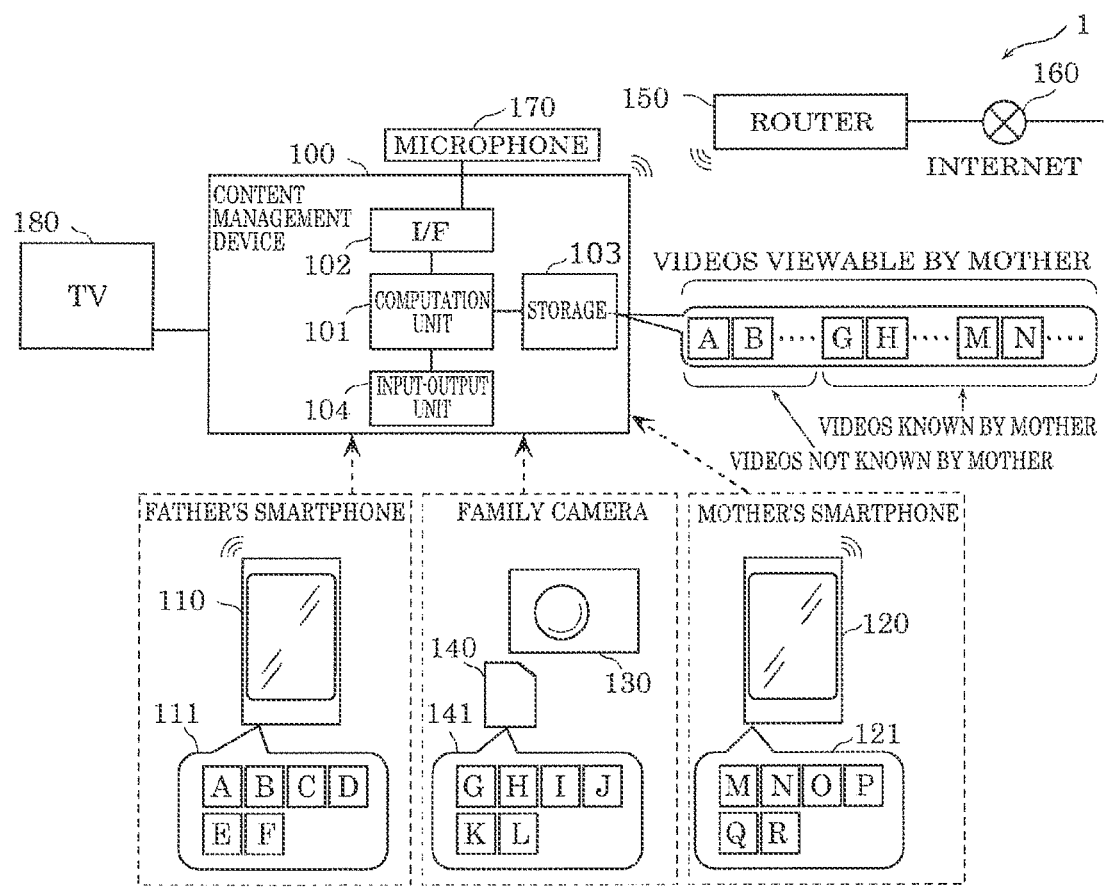
FIG. 1 is a diagram that illustrates the configuration of a content management device according to Embodiment 1.

The following describes issues that can occur in the conventional content management device when contents are transmitted between family members.

One issue relates to the fact that many of the videos collected and stored in a content management device are imaged by an imaging device such as a smartphone that is routinely carried by an individual, suggesting that many of such videos are relatively highly private or confidential. When videos stored in a smartphone, etc. are automatically uploaded to the content management device to be shared by family members, the contents owned by an individual will be made public among the family members. This may cause a privacy problem. Stated differently, when contents managed by an individual (also referred to as individual content(s)) are to be managed by the content management device in a collective manner in the family, i.e., such contents are to be managed by the family members for shared use, a privacy or confidentiality problem will occur, which is an issue that should be solved.

Another issue relates to a service that creates a digest version moving image of a single event (or incident) with a focus on a specified one day or a specified location in displaying videos collected and stored in the content management device. However, when editing into a single digest version the videos of a single event that spans more than a day, such as a trip, it is not easy, even manually, to create a well-edited video. In the case of events such as a trip and a child's athletic contest, for example, there has been no display function of recognizing whether each event is a trip or an athletic contest, and extracting and showing only events in the same context. The lack of such function sometimes causes inconvenience when the user is viewing past videos. When the user displays on a map a video imaged on a trip to Okinawa, not only the video of the Okinawa trip the user wishes to view, but also contents such as videos imaged in another Okinawa trip in the past, or on a business trip to Okinawa are displayed together on the Okinawa map on the screen. The user thus fails to view only the video of a specified Okinawa trip, which is another issue that should be solved.

The present disclosure aims to provide a content management device and a control method for the same that solve the above issues. More specifically, such content management device is capable of displaying contents collected from a plurality of devices without causing a privacy problem for a content holder, an individual who imaged the contents, etc. The content management device is also capable of automatically creating and providing a digest version moving image in which a plurality of contents are collected as a user recallable single past event. The present disclosure also aims to provide a method and a device that enable content display or voice interactive operation that is easy to understand for anyone who handles individual contents in the content management device.

The following describes the embodiments of the present invention with reference to the drawings.

Note that embodiments described blow are mere examples of the display device according to the present disclosure. The scope of the present disclosure is thus limited by the language recited in Claims with reference to the following embodiments, and thus is not limited only to the following embodiments. Of the structural components described in the following embodiments, structural components not recited in any one of the independent claims that indicate the broadest concepts of the present disclosure are not necessarily required to achieve the object of the present disclosure, and thus are described as elements for achieving a more preferred mode.

Also note that the drawings are schematic diagrams resulted from making some emphasis, omission, ratio adjustment, etc. as appropriate to illustrate the present disclosure. It should thus be understood that the actual shapes, positional relationship, and ratio may be different.

Embodiment 1

1.1. Configuration

FIG. 1 is a diagram that shows an exemplary configuration of the overall system for implementing the content management device and the control method for the same according to the present embodiment.

Content management system 1 shown in FIG. 1 includes one or more terminal devices such as a smartphone and a camera, and content management device 100. The terminal devices are connected to content management device 100 directly, or via a network such as the Internet, and a router. FIG. 1 shows an example in which content management system 1 includes father's smartphone 110, mother's smartphone 120, and family camera 130 as terminal devices, and these terminal devices are wirelessly connected to content management device 100.

Each of father's smartphone 110 used by father, mother's smartphone 120 used by mother, and family camera 130, which is a digital still camera shared use by all the family members, images individual contents (also referred to simply as contents) such as pictures and moving images. Smartphone 110 and camera 130 hold contents created by imaging. Each of smartphone 110 and camera 130 transmits or receives a video signal, an audio signal, or a control signal to and from content management device 100 wirelessly or over wired network, via Internet 160 or router 150, or directly via a USB cable, etc. Note that router 150 is, for example, a Wi-Fi router. Internet 160 is connected to various servers (not illustrated) to enable the transmission of a control signal, video/audio signals, application software, etc. to and from content management device 100.

The present embodiment describes contents 111 imaged or managed by father's smartphone 110 as content A through content F, contents 121 imaged or managed by mother's smartphone 120 as content M through content R, contents 141 imaged or managed by family-shared digital still camera 130 as content G through content L. Digital still camera 130 allows attachment of recording card 140 as a storage medium, in which contents 141 (content G through content L) are recorded. An example of recording card 140 is an SD card.

These contents are individually managed by the owners (or the users) of the terminal devices. To share among the family members contents that belong to another member and to collectively manage all the contents, a method is used in which such contents are captured and managed in a personal computer that can be shared use by the family members, or a network-attached storage (NAS) that is a huge storage on a network (e.g., Internet 160). Content management system 1 according to the present embodiment uses content management device 100 to centralize and collectively manage the contents that are individually managed by the family members.

Content management device 100 includes: computation unit 101 that performs various program processes; microphone 170 (for voice-activated operations) that accepts user operations; interface (I/F) 102 that has a function of inputting and outputting a control signal from a remote control (not illustrated) or a terminal device, a video signal, or an audio signal such as a content; storage 103 in which contents are stored; input-output unit 104 that outputs images onto a display device such as television receiver (TV) 180; and others. Image output by input-output unit 104 can be achieved, for example, by wired transmission such as high-definition multimedia interface (HDMI®), or wireless transmission such as Miracast and Chromecast. The configurations of these structural components are equivalent to those of general NASs or home appliances, and thus will not be described in detail. Note that computation unit 101 is also referred to as a manager. Also note that content management unit 100 may include TV 180.

Content management device 100 picks up by microphone 170 a user instruction (utterance) through a voice-activated operation, converts the words concerning such voice-activated operation into a control command, and performs a process in response to the control command. To display auxiliary information on TV 180 as video when a voice-activated operation is given, computation unit 101 updates screen images in line with the voice-activated operation. These screen images are outputted onto TV 180 from input-output unit 104 of content management deice 100 via an HDMI® to be presented to the user.

To enable data communication between terminal devices and content management device 100, etc., content management system 1 according to the present embodiment includes router 150 for Wi-Fi wireless communication. Such router 150 enables each of the terminal devices to wirelessly (through Wi-Fi) communicate with other terminal devices at home over Internet 160.

1-2. Operation

The following describes the operation of a content display method performed in content management system 1.

With reference to FIG. 1, a description will be given of the case where videos owned by the respective terminal devices, i.e., father's smartphone 110, mother's smartphone 120, and camera 130 are automatically uploaded to content management device 100 to be shared among the family members.

In this case, the videos of contents M through R imaged mainly by mother using mother's smartphone 120 are known by mother. Contents G through L imaged by family-shared digital still camera 130 relate to events participated by family members, and thus are possibly known by mother.

Meanwhile, contents A through F, which are videos owned by father's smartphone 110 used by father, are not likely to be contents known by mother, and thus might include highly confidential information for father that is not desired to be shared even among the family members.

Content management device 100 according to the present embodiment enables the storage or display of family-shared contents while protecting the privacy or confidentiality of the individuals, and achieves collective management of contents obtained from a plurality of terminal devices.

Content management device 100 according to the present embodiment operates in the following manner.

Figure 2:
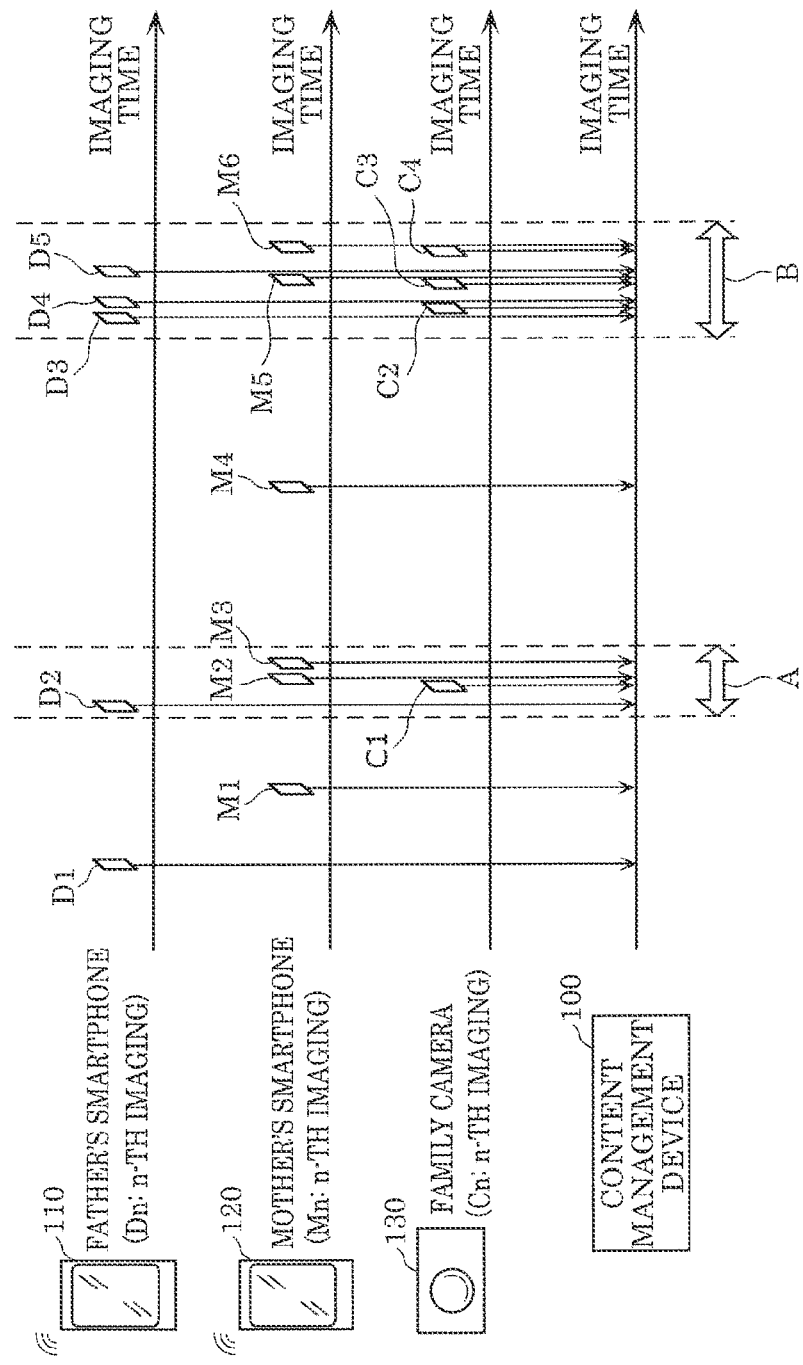
FIG. 2 is a diagram that illustrates a method of identifying a family event performed by the content management device according to Embodiment 1.

FIG. 2 is a diagram that illustrates the operation performed in content management system 1. FIG. 2 shows contents recorded in storage 103 of content management device 100 in chronological order of imaging. In the diagram, contents imaged by father's smartphone 110 in a certain same time frame are represented as D1 through D5, contents imaged by mother's smartphone 120 in the same time frame as M1 through M6, and contents imaged by the family-shared digital still camera in the same time frame as C1 through C4. This diagram shows the contents in chronological order, i.e., in order of imaging time, where contents are newer toward right. Note that "contents imaged" includes newly added contents through downloading, etc.

Computation unit 101 of content management device 100 determines the order of arranging the contents from information on the imaging or recording dates/times assigned to the respective contents recorded in storage 103.

When a specific terminal device is previously designated in content management device 100, computation unit 101 groups contents having date and time information close to the contents of the designated terminal device. The present embodiment specifies camera 130 as the designated terminal device. Camera 130 is family-shared digital still camera 130, and thus the time frame in which content 1 was imaged by digital still camera 130 and the time frame in which contents C2 through C4 were imaged are likely to be time frames in which some sort of family events that can be shared by all the family members were imaged. For this reason, for example, time frames that include the previous and subsequent hours of the respective contents C1 through C4 imaged by family-shared digital still camera 130 are set as time frames of family event A and family event B.

As a result, computation unit 101 identifies contents D2, M2, M3, and C1 as the contents imaged in family event A. Similarly, computation unit 101 identifies contents D3, D4, D5, M5, M6, C2, C3, and C4 as family event B.

As described above, content management device 100 captures all contents into storage 103 from the terminal devices connected, after which computation unit 101 determines a specific time frame from the contents of the designated terminal device. Content management device 100 then determines that contents included in such specified time frame as contents that can be managed as event contents to be shared by the family members. Content management device 100 according to the present embodiment is capable of deriving the contents that can be shared as a family event from the times at which the family-shared terminal device imaged contents.

Content management device 100 is capable of outputting the following contents from input-output unit 104, and displaying such contents onto TV 180: contents identified as contents related to family event A, i.e., content D2, content M2, content M3, and content C1; and contents identified as contents related to family event B, i.e., content D3, content D4, content D5, content M5, content M6, content C2, content C3, and content C4. These are family event-related contents, and thus the privacy of individuals who imaged such contents is protected even when the contents are displayed on a display device such as TV 180. Meanwhile, content management device 100 determines that content D1, content M1, and content M4, which were not imaged in the specified time frame, as highly private contents, and prohibits such contents from being displayed on TV 180 without checking with the terminal device from which contents were previously captured or the owner of such terminal device.

Computation unit 101 of content management device 100 is also capable of outputting the following contents identified as contents of family events from I/F 102 to each of the terminal devices, i.e., father's smartphone 110 and mother's smart phone 120: content D2, content M2, content M3, content C1, content D3, content D4, content D5, content M5, content M6, content C2, content C3, and content C4. These identified contents can be transmitted to the respective terminal devices of the individuals as family-shared contents.

1.3. Effect, etc.

As described above, content management device 100 determines a specified time frame from the imaging times of the contents of a designated terminal device among a plurality of recorded contents to determine specific contents, thereby displaying and managing the specific contents, while protecting the privacy or confidentiality of the individuals.

1.4. Variation 1 of Embodiment 1

The following describes a variation of the terminal devices capable of managing a plurality of contents while protecting the privacy or confidentiality of the individuals. The present variation manages contents while protecting the privacy or confidentiality of the individuals in the following manner: when any of the terminal devices is an imaging device capable of recording global positioning system (GPS) information on an imaging point at the time of imaging a picture or a moving image, such as a digital camera and a smartphone, the present variation identifies an event of the user (or the person who imaged the content) of the terminal device from the GPS information on the imaging point provided to the content such as video imaged by such terminal device. Here, the GPS information on the imaging point means, in a more general term, position information on the imaging point, and includes information indicating, for example, longitude and latitude information.

The configuration of the present variation will be described by use of the system shown in FIG. 1. Video contents such as pictures transmitted from the terminal devices shown in FIG. 1, i.e., smartphones 110 and 120, or camera 130, are added with location information on the imaging points of the respective contents, e.g., GPS information. Such plurality of contents are recorded in storage 103 of content management device 100. Computation unit 101 of content management device 100 reads the GPS information to manage the contents.

Figure 3:
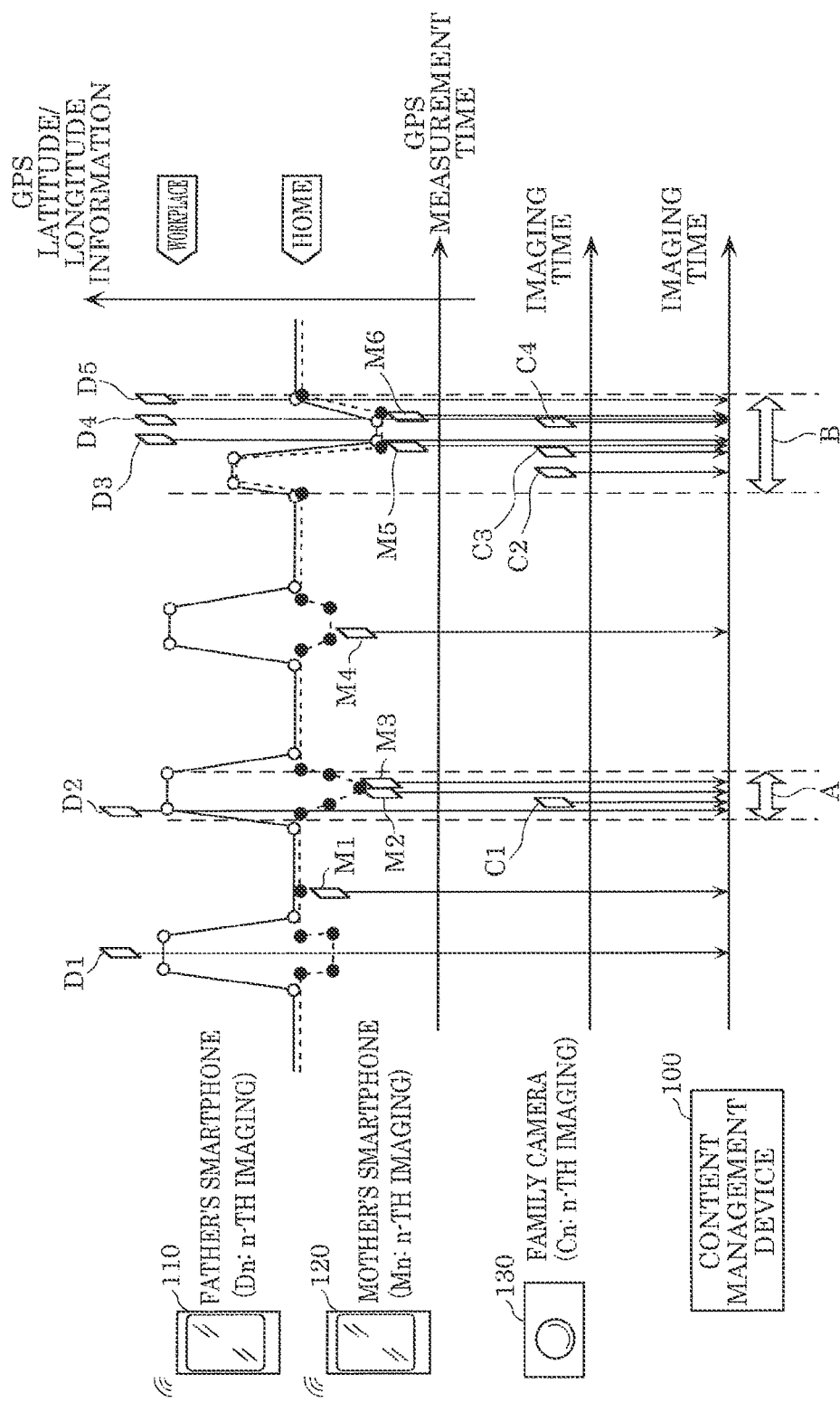
FIG. 3 is a diagram that illustrates a method of identifying a family event performed by the content management device according to Variation 1 of Embodiment 1.

FIG. 3 shows contents imaged by each of father's smartphone 110 and mother's smartphone 120 that are displayed in accordance with: imaging position information corresponding to GPS information shown in the vertical direction on the plane of the diagram; and video imaging time information shown in the horizontal direction on the plane of the diagram, i.e., the time at which the corresponding GPS information was measured at the time of imaging. White circles represent contents imaged by father's smartphone 110, and black circles represent contents imaged by mother's smartphone 120. Contents imaged by family camera 130 are shown in accordance with imaging times. Contents imaged by camera 130 are likely to have been imaged in a family-gathering event, and thus FIG. 3 represents the previous and subsequent hours of the time at which content C1 was imaged as the time frame of family event A, and represents the time frame including contents C2, C3, and C4 imaged during a short period as the time frame of family event B.

According to FIG. 3, contents D1 and D2 can be estimated from the GPS information to have been imaged by father in the workplace using father's smartphone 110, and content M1 imaged by mother's smartphone 120 can be estimated to have been imaged by mother at home.

Timing at which father's smartphone 110 and mother's smartphone 120 were in a relatively close proximity is in the time frame of family event B in which black circles and white circles are located nearby with each other. Meanwhile, in the time frame of family event A, the imaging points of content D2 and content M2, which were imaged at an approximately the same time (e.g., within an hour) are greatly different. This means that father, who routinely carries father's smartphone 110, and mother, who routinely carries mother's smartphone 120, were in distant places (e.g., one kilometer or more distant from each other) during the time frame of family event A.

Stated differently, even when contents were created by imaging performed by the father's and mother's smartphones during a specified period, but when it is determined from GPS information that such contents were imaged in different locations, father and mother can be determined as not having participated in the same event.

In the above-described embodiment, family event A and family event B are identified as family events from the imaging times as shown in FIG. 2, but the present variation identifies that event B in FIG. 3 is a family event in which father and mother participated together, and that event A is not an event in which father and mother participated together, and thus not a family event.

Consequently, contents D3, D4, and D5 imaged by father, contents M5 and M6 imaged by mother, and contents C2, C3, and C4 imaged by family camera 130 are recognized as contents of family event B from the GPS information and GPS measurement time information (imaging time information). This means that these contents can be determined as being made public (shared) among the family members in consideration of privacy or confidentiality.

Also, the knowledge of which one of father and mother was carrying family-shared digital still camera 130 enables to form family content A together with contents imaged by the smartphone of one of the persons who was carrying camera 130. For example, the use of similarity of information on the imaged videos is one way to identify the person who was carrying camera 130, although such information is of low reliability. When the same person is in pictures imaged by mother's smartphone 120 and the digital still camera, and such fact is guaranteed with a sufficiently high accuracy, using, for example, a face recognition technology, the contents of family event A can be formed by videos of mother's smartphone 120 and the digital still camera.

As described above, content management device 100 according to the present variation is capable of highly accurate estimation of family events by a combined use of GPS information indicating imaging points and time information. Here, in many cases, for example, GPS information is embedded in the corresponding file in one of the formats of EXIF meta data when contents are pictures, and GPS information is embedded in the corresponding file in one of the formats of QuickTime meta data when contents are moving images. This enables content management device 100 to display and manage identified contents while protecting the privacy or confidentiality of the individuals.

1.5. Variation 2 of Embodiment 1

Figure 4:
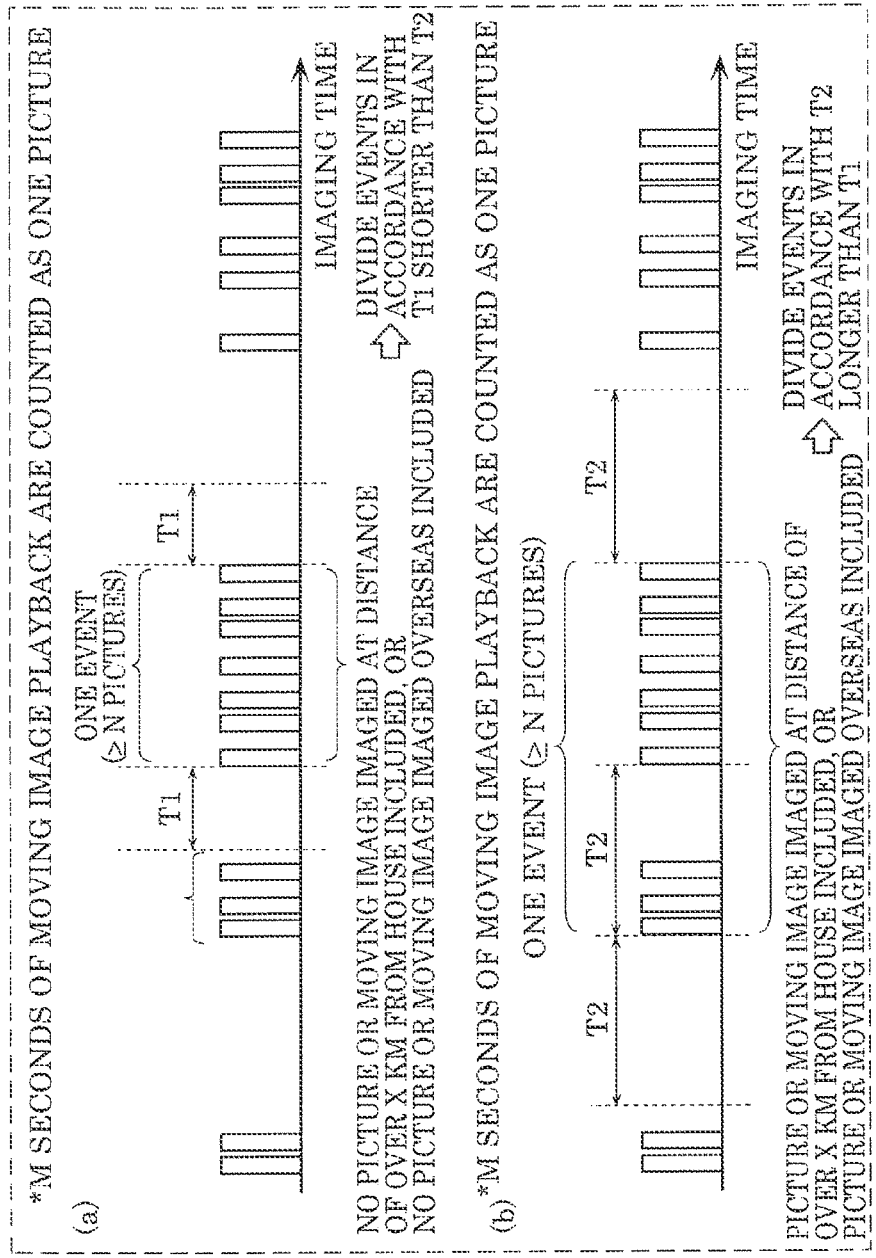
FIG. 4 is a diagram that illustrates a method of identifying a family event performed by the content management device according to Variation 2 of Embodiment 1.

FIG. 4 is a diagram that illustrates a method of detecting an event from accumulated individual contents. Contents discussed here are previously determined as having no privacy or confidentiality problem when shared among the family members.

(a) of FIG. 4 shows a series of imaged pictures or moving images that are arranged in order of imaging time on the basis of the imaging time information assigned to each of such pictures or moving images. When another picture or moving image is present in a period of the previous or subsequent T1 hour of the time at which each of the pictures or moving images was imaged, computation unit 101 of content management device 100 determines that such picture or moving image was imaged in the same event and processes it to be allocated to the same group. Stated differently, computation unit 101 divides pictures or moving images into a plurality of groups in accordance with a period that exceeds a predetermined T1 hour (also referred to as non-imaging period) among the periods between which each picture or moving image was imaged.

Computation unit 101 allocates pictures or moving images into a plurality of groups, and when the number of pictures or moving images that belong to one group exceeds N pictures as a result, performs a process of registering the pictures or moving images in such group collectively as the same single event. Note that M seconds of moving image playback can be counted as one picture.

When determining that the imaging locations of the pictures or moving images that belong to the single event are all within a close range from the house (e.g., within X kilometers) or within the country, on the basis of information indicating the imaging location, such as GPS information, that is added to each picture or moving image, computation unit 101 completes the event detection process, and records or registers the result into storage 103 as database.

This facilitates the future access to the contents that form such event.

Meanwhile, when determining that the event detected in this detection process includes a picture or a moving image imaged in a far distance (e.g., X kilometers or greater) from the house or outside of the country, computation unit 101 prolongs the length of the non-imaging period from T1 hour to T2 that is longer than T1, and performs again a process of allocating pictures or moving images into the group.

Consequently, as shown in (b) of FIG. 4, even when an interval between each picture imaging is relatively long such as in the case of an overseas trip that requires relatively long hours of travel, the length of the non-imaging period is set long and computed. For example, when an interval between each picture imaging is 12 hours (T1) or longer, the length of the non-imaging period is set at 24 hours (T2) and computed. This enables to collectively manage, as a group, contents such as pictures or moving images imaged in an overseas trip as a single event.

As described above, when a plurality of contents created by a plurality of terminals have been captured, computation unit 101 allocates, into a plurality of groups, contents having a plurality of consecutive imaging times without any non-imaging periods exceeding a predetermined time length, from among the intervals between the imaging times of a plurality of contents. Here, each of the plurality of groups includes a predetermined or greater number of contents. Here, the predetermined time length is longer as the distance is greater between the imaging location of a content and the house of the owner of the terminal device (imaging device) of such content.

Also, the predetermined time length may be set longer when the country in which a content was imaged is different from the country in which the house of the owner of the terminal device (imaging device) of such content is located.

As described above, content management device 100 groups contents differently depending on the imaging times and imaging locations (the distance from the house, the county in which contents were imaged), thereby allocating a series of related contents into the same group. Grouping of highly related contents together enables to collectively display the contents that belong to a single family event, and give consideration to privacy or confidentiality at the time of content management.

1-6. Variation 3 of Embodiment 1

With reference to the drawings, the following describes a method of identifying whether an event is a family event, by use of beacon radio waves instead of GPS information.

Figure 5:
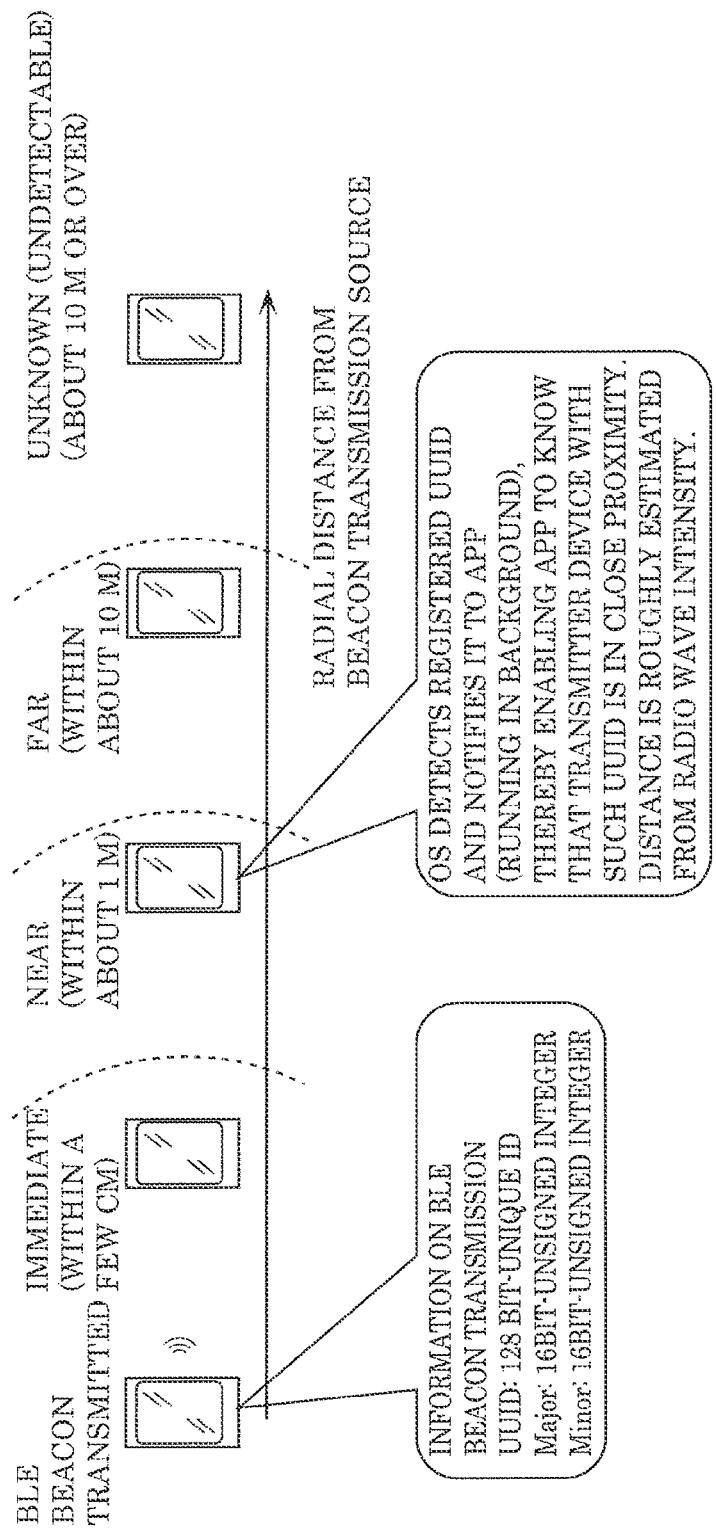
FIG. 5 is a first diagram that illustrates distances of beacon transmission according to Variation 3 of Embodiment 1.

In the present variation, the use of a beacon signal (also referred to simply as beacon) compliant with a predetermined wireless communication standard is conceivable to know that a smartphone is in close proximity. One possible example is the use of beacons of Bluetooth® low energy (BLE), which is a wireless communication standard, (hereinafter also referred to as BLE beacons). As shown in FIG. 5, a BLE beacon includes identification information (UUID) for identifying a beacon transmitter, and auxiliary identification information (Major, Minor) for more detailed identification in the same UUID, etc. Such identification information, when previously shared between a transmitter device and a receiver device of BLE beacons, enables to detect whether the receiver device is in close proximity of the transmitter device.

Figure 6:
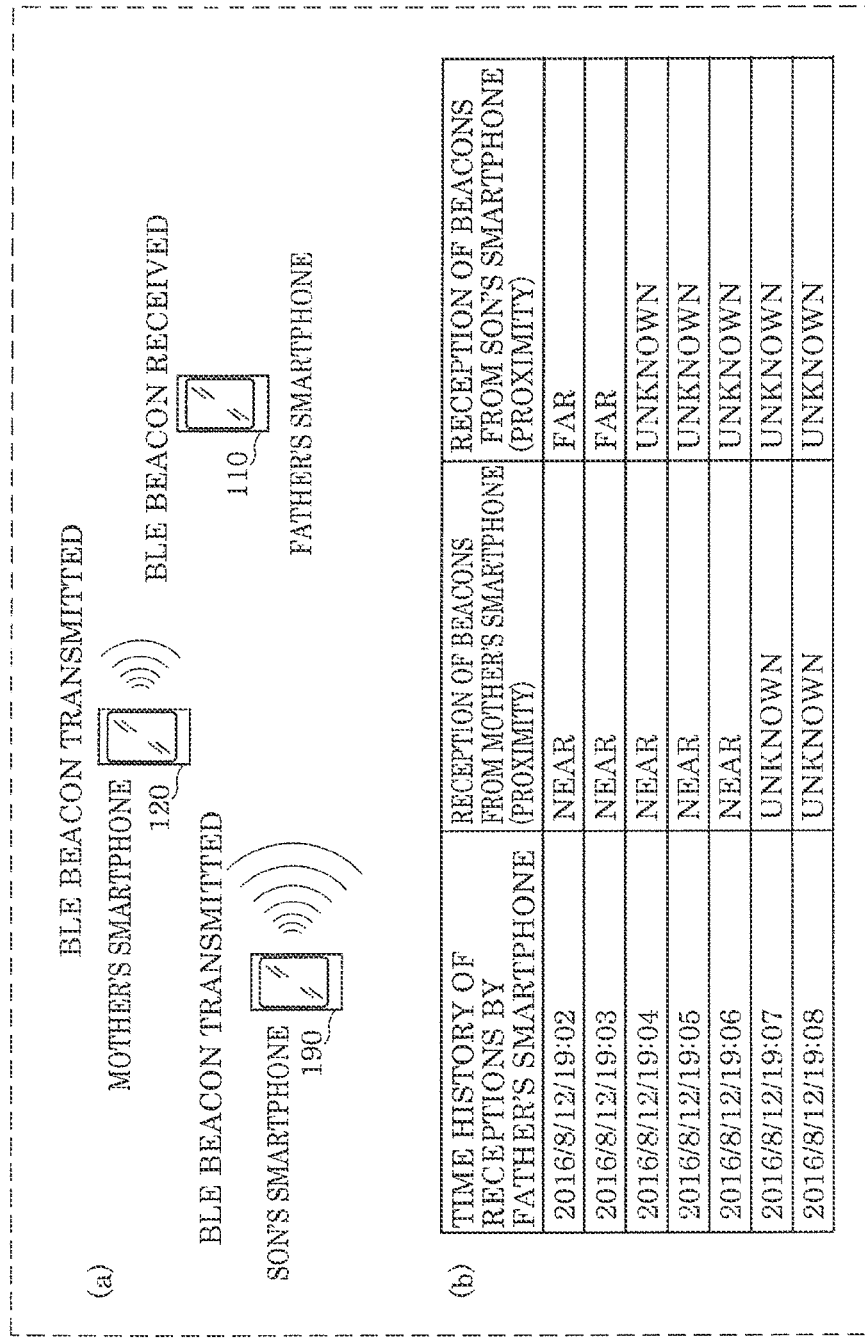
FIG. 6 is a second diagram that illustrates distances of beacon transmission according to Variation 3 of Embodiment 1.

FIG. 6 is a table showing the history records of when father's smartphone 110 received beacons transmitted from mother's smartphone 120 and beacons from son's smartphone 190, and the distance estimation at the time of the respective beacon receptions.

The beacon receiver device keeps detecting beacons with specified identification information (UUID), and estimates the distance to a beacon transmitter device on the basis of the radio wave intensity of the beacon at the time of detecting such beacon. The present variation sets a plurality of levels for the positional relationships between a transmitter device and the receiver device. More specifically, as shown in FIG. 5, the positional relationships are categorized as follows: "Intermediate" when the reception intensity is one that is likely to be obtained with the distance being several centimeters between a transmitter device and the receiver device; "Near" when the reception intensity is one that is likely to be obtained with such distance within about one meter; "Far" when the reception intensity is one that is likely to be obtained with such distance being within about ten meters; and "Unknown" indicating that beacons are undetectable.

As shown in (a) of FIG. 6, mother's smartphone 120 and son's smartphone 190 transmit beacons, for example, at the top of every minute. An application installed in father's smartphone 110 causes father's smartphone 110 to enter a standby state for receiving beacons from mother's smartphone 120 and son's smartphone 190 in the time frame of beacon transmission (around the top of every minute), and record the results. (b) of FIG. 6 illustrates exemplary results of determining positional relationships with mother's smartphone 120 and son's smartphone 190. Such results are obtained by father's smartphone 110 detecting beacons transmitted from mother's smartphone 120 and son's smartphone 190 between 19:02 on Aug. 12, 2016 and 19:08 on the same day, and identifying the reception intensity of each of such beacons.

(b) of FIG. 6 indicates that the distance between father's smartphone 110 and mother's smartphone 120 from 19:02 on Aug. 12, 2016 to 19:06 on the same day is represented as "Near," suggesting that these smartphones were within about one meter distance. Meanwhile, the distance is represented as "Unknown" at 19:07 and after on the same day, i.e., the distance was undetectable. This means that father's smartphone 110 was in a distant location to which a beacon transmitted from mother's smartphone 120 could not reach.

Similarly, the distance between father's smartphone 110 and son's smartphone 190 is represented as "Far" from 19:02 on Aug. 12, 2016 to 19:03 on the same day, suggesting that these smartphones were within about ten meters distance. From 19:04 and after on the same day, father's smartphone 110 was in a distant location to which a beacon transmitted from son's smartphone 190 could not reach.

It is conceivable that a unique application for automatic uploading of contents into content management device 100 or other purposes is installed in each of the smartphones. The use of such application to share the beacon identification information of the devices used by the family members achieves determination with higher accuracy of whether a family member was in close proximity at a specified time than in the case of using GPS information.

Note that there is an issue of having to adjust the timing between transmission and reception, i.e., the receiver device needs to receive a beacon while a transmitter device is transmitting the beacon. When both of the devices have relatively accurate time synchronization (e.g., seconds accuracy), the issue of timing adjustment is solved by these devices performing a beacon transmission process and a beacon reception process at around the top of every minute, respectively. This prevents the failure of beacon detection due to the timing difference, or the waste in power consumption due to needless transmission and wait of beacons.

FIG. 7A is a diagram that illustrates the above determination process. FIG. 7A shows the respective contents imaged by father's smartphone 110, mother's smartphone 120, and family camera 130 that are arranged in chronological order of imaging, as in the case of FIG. 2 according to Embodiment 1. FIG. 7A also shows family events A and B identified by the family event identification method according to Embodiment 1.

Content management device 100 receives from father's smartphone 110 the received beacons history to obtain the situation of beacon receptions and the determination result of the distances to the beacon transmitter devices. Computation unit 101 of content management device 100 calculates the distance between father's smartphone 110 and mother's smartphone 120 from such received beacon history. Consequently, computation unit 101 determines that father and mother were not within a specified distance (e.g., within ten meters distance), thereby determining that no family event was taking place. This improves the accuracy of identifying the presence/absence of a family event.

Assume, for example, that no beacon reception was successful between father's smartphone 110 and mother's smartphone 120 from information on the received beacon history corresponding to the time frame of event A in FIG. 7A. This means not only that mother's smartphone 120 failed to receive not a single beacon transmitted from father's smartphone 110 during such time frame, but also that father's smartphone 110 failed to receive not a single beacon transmitted from mother's smartphone 120 during such time frame. In such case, the father's smartphone and the mother's smartphone are determined as not having been in a close proximity of about 10 meters distance during the time frame of event A. It is thus possible to determine that event A is not a family event participated by father and mother at least at the same time.

As described above, computation unit 101 determines that event A is not a family event when determining that father's smartphone 110 and mother's smartphone 120 were not within a predetermined distance even during the time frame of event A that has been identified as a family event by the identification method according to Embodiment 1.

Meanwhile, when the beacon reception by at least one of father's smartphone 110 and mother's smartphone 120 was successful therebetween more than once during the time frame of event B shown in FIG. 7A, computation unit 101 determines that father and mother participated in the same event, and manages event B (contents that belong to event B) as permissible contents that can be shared by father and mother, or all the family members.

Computation unit 101 according to the above-described variation, manages a predetermined or greater number of contents included in each of the plurality of groups as permissible contents that are permitted to be presented by the plurality of terminals when determining that each of the one or more terminals received the beacon signal during a period in which the predetermined or greater number of contents included in each of the plurality of groups were imaged.

Also, in the present variation, terminal devices measure the distance from each other by transmitting beacons therebetween, and accumulate the recorded beacon data. Content management device 100 then obtains from the terminal devices the contents such as pictures, thereby performing update and obtaining data on the beacon receptions of the respective terminal devices. Computation unit 101 of content management device 100 grasps the positional relationships between the terminal devices from such data on beacon receptions to determine whether these terminal devices were in the same event. This configuration achieves a detailed determination on the relevance between the collected contents, and an accurate determination on the presence/absence of related contents. The present variation thus enables to determine whether contents collected from a plurality of terminal devices should be displayed, or manage such contents in consideration of privacy or confidentiality.

As described above, content management device 100 according to the present variation includes storage 103 and manager 101A as shown in FIG. 7B. Manager 101A is implemented, for example, by computation unit 101 according to Embodiment 1 executing a predetermined program by use of a processor.

Storage 103 stores (a) a content generated by imaging performed by a first terminal that is at least one of a plurality of terminals, (b) a time at which the imaging of the content was performed, and (c) a history indicating whether each of one or more terminals among the plurality of terminals excluding a second terminal received, during a period that includes the time at which the imaging was performed, a beacon signal transmitted from the second terminal by radio waves, the second terminal being at least one of the plurality of terminals.

Manager 101A manages the content as a permissible content that is permitted to be presented by the plurality of terminals when determining, with reference to storage 103, that each of the one or more terminals received the beacon signal during the period. Note that manager 101A may output information for managing the above content as a permissible content. Also note that the first terminal and the second terminal may be the same terminal, or may be mutually different terminals.

Here, the second terminal may transmit the beacon signal at a predetermined time that is repeatedly set. In this case, each of the one or more terminals enters a standby state for receiving the beacon signal during a reception standby period that includes the predetermined time, and generates a history indicating whether each of the one or more terminals received the beacon signal during the reception standby period. The generated history is transmitted from each of such terminals to content management device 100 to be recorded in storage 103.

FIG. 7C is a flowchart of a control method for use in content management device 100 according to the present variation.

In step S101, as shown in FIG. 7C, manager 101A determines, with reference to storage 103, whether each of one or more terminals received a beacon signal during the above period. When determining that each of one or more terminals received the beacon signal during the above period, manager 101A goes onto step S102, and terminates a series of processes shown in FIG. 7C otherwise.

In step S102, manager 101A manages the above content as a permissible content which is permitted to be presented by the plurality of terminals. A series of processes shown in FIG. 7C terminates upon the completion of step S102.

Assume, for example, that whether six smartphone terminals registered in the content management device received at least one beacon from the smartphone terminals during a predetermined time frame is listed as shown in FIG. 7D. Here, the beacon from terminal 1 was received by terminal 2 and terminal 3, the beacon from terminal 2 was received by terminal 4, and the beacon from terminal 3 was received by terminal 1. Meanwhile, beacon reception was unsuccessful between the other terminals.

Figure 7E:
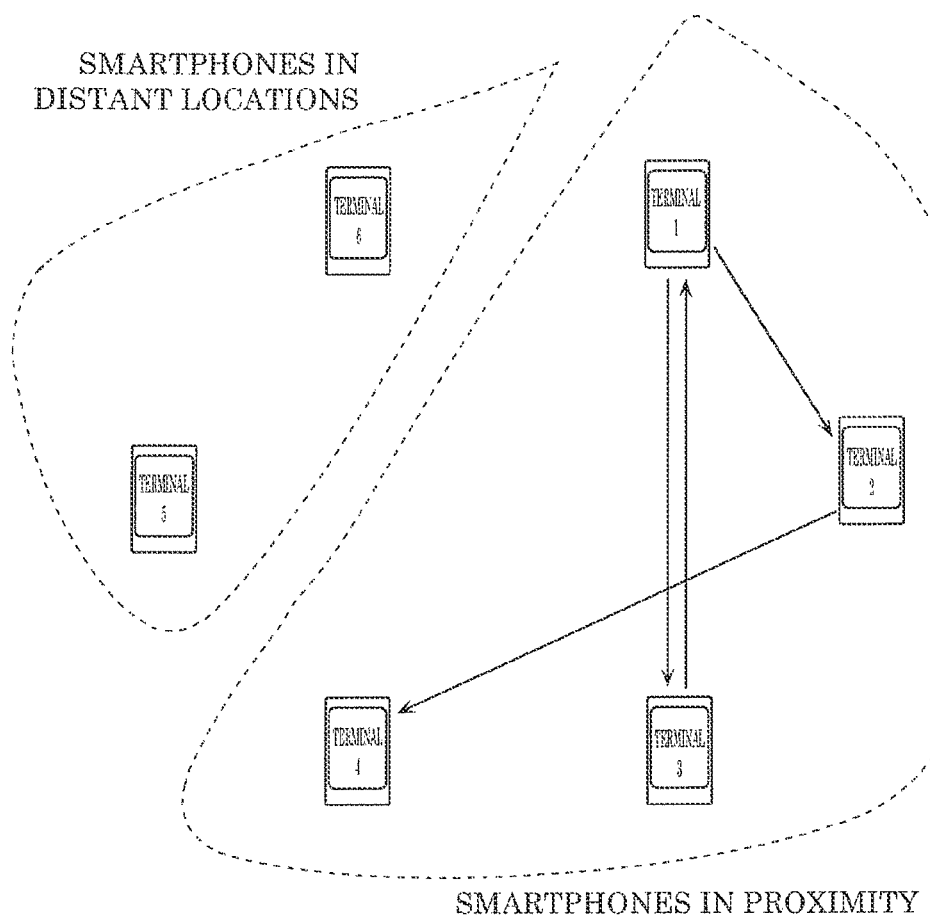
FIG. 7E is a diagram that illustrates exemplary positional relationships between terminals according to Variation 3 of Embodiment 1.

FIG. 7E illustrates such relationships. Among the beacons transmitted from the respective terminals, only the beacons received are connected by arrows to represent the relationships as shown in FIG. 7E.

Here, manager 101A described above associates terminals between which beacon transmission was successful (pairs of two terminals connected by arrows in FIG. 7E), and consequently determines that a group of terminals connected by arrows in FIG. 7E were in close proximity to which beacons could reach during the above time frame. In this example, it is thus determined that four terminals, terminal 1, terminal 2 and terminal 3 in the proximity of terminal 1, and terminal 4 in the proximity of terminal 2 located near terminal 1 were in the proximity during the above time frame. Meanwhile, terminal 5 and terminal 6, with which beacon transmission was unsuccessful with any terminals, are determined as having been in distant locations from terminal 1, etc. where no beacon could reach. In the case shown in FIG. 7D or FIG. 7E, terminal 1, terminal 2, terminal 3, and terminal 4 are determined as having participated in the same event, and thus there is little risk attributable to the sharing of the contents imaged by the respective terminals. Such contents are thus managed as permissible contents for these terminals (the four terminals of terminal 1 through terminal 4). Such contents may not be managed as permissible contents for terminal 5 and terminal 6, to which the presentation may be prohibited.

Manager 101A identifies a group of terminals, including a first terminal that imaged a content, among which beacon transmission was successful with at least the first terminal during a predetermined period that includes the time at which the first terminal imaged such content. Manager 101A manages the content so that the content is presented only to the terminals included in the group, or to the owners of such terminals.

Manager 101A may also manage the content as a permissible content to all the terminals registered at the point in time when the number of terminals in the group formed in the above manner exceeds a predetermined ratio relative to the number of terminals registered in content management device 100, or/and when a predetermined terminal joins the group.

This enables content management device 100 to effectively solve the privacy or confidentiality problem.

As described above, content management system 1 includes a plurality of terminals 110, etc., and content management device 100 that is connected to the plurality of terminals 110, etc., and that manages contents generated by such plurality of terminals 110, etc. The plurality of terminals 110, etc. transmit and receive contents to be generated and beacon signals utilizing radio waves.

Content management device 100 includes a storage and a manager. Note that the storage corresponds to storage 103 described above. The manager corresponds to computation unit 101 described above.

The storage stores (a) a content generated by a first terminal that is one of the plurality of terminals 110, etc., (b) a time at which the content was generated, and (c) information indicating whether a terminal among the plurality of terminals 110, etc. excluding the first terminal succeeded or failed to receive, during a period that includes the time, the beacon signal transmitted from the first terminal among the plurality of terminals 110 etc.

The manager permits the terminal to present the content generated by the first terminal. Such terminal is a terminal that is different from the first terminal among the plurality of terminals 110, etc. and that succeeded in receiving the beacon signal transmitted from the first terminal during a time frame that includes the time at which the content was generated. This effectively solve the concerns about privacy/confidentiality and operability for content viewing.

Here, the manager may further permit a second terminal to present the content generated by the first terminal. Such second terminal is a terminal that transmitted a beacon that the first terminal succeeded in receiving during the time frame. This configuration enables the content management system to more easily determine a terminal to which content viewing is permitted on the basis of whether such terminal has succeeded in beacon reception.

Here, the manager may further permit a third terminal to present the content generated by the first terminal. Such third terminal is a terminal that succeeded in one of beacon transmission and beacon reception performed with the second terminal during the time frame. This configuration enables the content management system to more easily determine a terminal to which content viewing is permitted on the basis of whether such terminal has succeeded in one of beacon transmission and beacon reception.

Terminals permitted to present the content generated by the first terminal may be added one by one in a successive manner as described above. More specifically, the addition of terminals may be performed in the following manner so that an N-th terminal is included: add the second terminal that succeeded in beacon transmission/reception performed with the first terminal within a period that includes the time at which the first terminal generated the content; add the third terminal that succeeded in beacon transmission/reception performed with the second terminal within the same period; and add the (N+1) terminal that succeeded in beacon transmission/reception performed with the N-th terminal within the same period. Here, N is an integer equal to or greater than 2.

Embodiment 2

With reference to FIG. 1, and FIG. 8A through FIG. 10, the following describes the operation performed by the content management device when displaying contents to an operator, and a method of displaying the contents. Note that such contents may be contents managed by the content management device according to Embodiment 1, or may be any other contents.

Figure 8A:
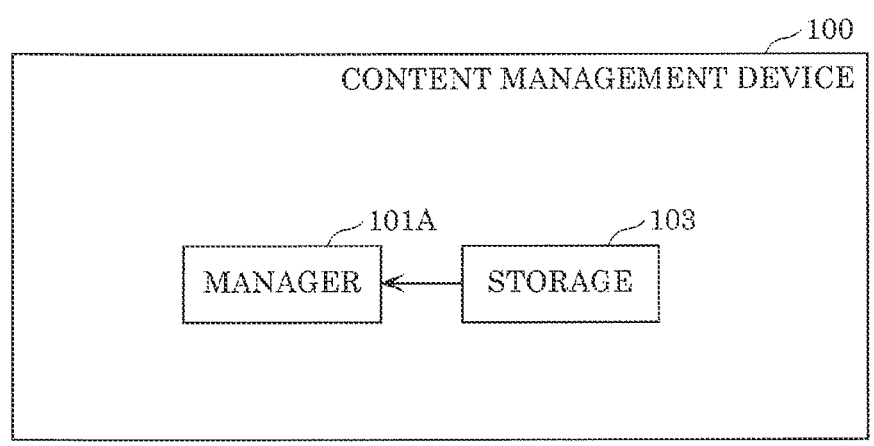
FIG. 8A is a diagram that illustrates the configuration of a content management device according to Embodiment 2.

FIG. 8A is a diagram that illustrates the configuration of content management device 100 according to the present embodiment.

As shown in FIG. 8A, content management device 100 according to the present embodiment includes storage 103 and manager 101A. Manager 101A is implemented, for example, by computation unit 101 according to Embodiment 1 executing a predetermined program by use of a processor.

Storage 103 stores a plurality of contents and management information on each of the plurality of contents (the imaging time, imaging location, information to identify a subject, etc.)

Manager 101A determines a character string that indicates the area classification that relates to a plurality of contents. In so doing, manager 101A determines the character string so that an area classification indicating the imaging location of the representative content among the plurality of contents covers a wider area as the distance is greater between such imaging location and the user house. Note that such character string is used, for example, as an opening caption to be described later, and can also be used as the name of a directory or a folder indicating the storage location of the contents in storage 103.

Here, manager 101A also determines the character string so that an area classification indicating the imaging location of the representative content among the plurality of contents covers a smaller area as the name recognition of such imaging location is higher, and/or that an area classification indicating the imaging location of the representative content among the plurality of contents covers a smaller area as the number of times the user has visited such imaging location is greater.

Figure 8B:
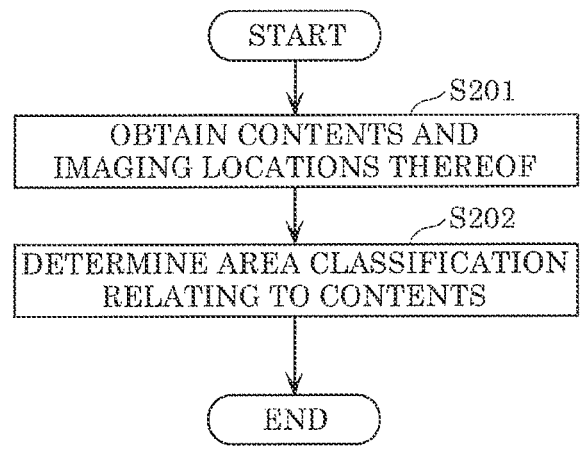
FIG. 8B is a flowchart of a control method for use in the content management device according to Embodiment 2.

FIG. 8B is a flowchart of a control method for use in content management device 100 according to the present embodiment.

In step S201, as shown in FIG. 8B, manager 101A obtains a plurality of contents and the imaging location of each of the contents from storage 103 that stores such plurality of contents and imaging location of each of the contents.

In step S202, manager 101A refers to the contents and the imaging locations of the respective contents obtained in step S201 to determine a character string indicating an area classification relating to the contents. In so doing, manager 101A determines the character string so that the area classification indicating the imaging location of the contents covers a wider area as the distance is greater between the imaging location of the contents and the user house.

In determining the character string, manager 101A may determine the character string so that an area classification indicating the imaging location of the contents covers a smaller area as the name recognition of the imaging location of the contents is higher.

This configuration enables content management device 100 to set a character string that represents an appropriate geographical name, on the basis of the imaging location of the contents, without requiring the user to explicitly set an appropriate character string.

The following describes in detail content management device 100.

Content management device 100 according to the present embodiment stores video contents, such as pictures or moving images, transmitted from a plurality of terminal devices. Content management device 100 obtains location information on the imaging locations of such videos. Content management device 100 then identifies videos that were imaged in locations within a predetermined distance in accordance with Embodiment 1, or on the basis of the location information. Content management device 100 then allocates such identified videos into a group, and creates a display content formed by collecting the videos belonging to such group. On the first screen that is shown when such display content is displayed, the range of the area classification is changed in accordance with the distance between the location information of the videos belonging to the group and a specified location so that a different area name is displayed when the area classification is selected and displayed.

Figure 8C:
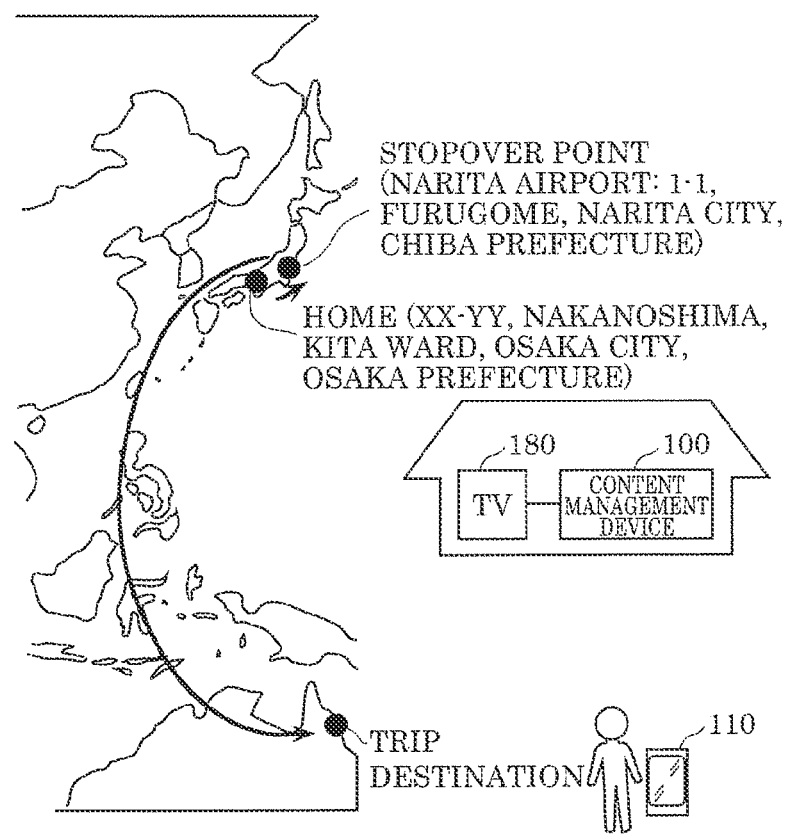
FIG. 8C is a diagram that illustrates an itinerary according to Embodiment 2.

FIG. 8C is a diagram showing, on a map, an itinerary of a certain person. An example case will be described in which the owner of content management device 100 (hereinafter referred to as the owner) whose home address is XX-YY Nakanoshima, Kita Ward, Osaka City, Osaka Prefecture visited a primary school in Cairns (a primary school in Parramatta; Mulgrave Road 122, Parramatta Park, Cairns, Queensland, Australia) via Narita Airport (1-1, Furugome, Narita City, Chiba Prefecture). The owner carried smartphone 110, which is a terminal device, and imaged pictures or moving images in the destination place.

The pictures or moving images imaged by the owner are recorded also in content management device 100. The owner can enjoy the contents that were recorded by use of content management device 100 on TV 180, which is a display device.

2-1. Configuration

FIG. 1 is used to describe the present embodiment. Content management device 100 is located in Osaka Prefecture, in which father, being the owner, resides. Contents such as pictures or moving images imaged by father being the owner, and mother and the son being family members during the trip are recorded in storage 103 of content management device 100. Computation unit 101 is capable of obtaining the addresses of the points visited during the family trip by use of contents added with GPS information on each of smartphone 110 being a terminal device carried by the owner, mother's smartphone 120, and the son's smartphone (not illustrated), and by use of database via which each piece of the GPS information is converted into an address. Here, the database may be replaced by an inquiry made via a Web API to a cloud service that converts GPS information into an address.

Computation unit 101 is capable of editing the contents by use of the GPS information, grouping the contents, for example, on a GPS information basis, displaying on TV 180 the screen that introduces the groups and the contents belonging to the respective groups, and also displaying the contents in chronological order on the basis of the time information.

2-2. Operation

Here, a too detailed address representation of a family trip destination is sometimes not desirable when displayed on TV 180. Suppose, for example, that the caption "Trip to Parramatta Park" is displayed on the top page of a digest version moving image in which contents related to the family trip are collected, and that pictures of such family trip are displayed on a viewer application. In this case, the expression "Parramatta Park" given on the display is not likely to give good recognition of the geographical name when its name recognition is low.

Stated differently, in the management of individual contents, a destination place needs to be represented differently for easy understanding, depending, for example, on the distance to the destination place, the name recognition of the destination place, and the number of times the destination place has been visited, etc. More specifically, how the address of a destination being a location to which one does not visit very often is represented determines the recognizability and manageability.

In view of this, content management device 100 determines how to represent contents on the screen when introducing the details of such contents, in accordance with a predetermined criterion, by use of information on the contents to be displayed, such as information added to such contents. The present embodiment describes an example case in which content management device 100 is located in the house, and the details are displayed differently depending on the distance between the house and the location indicated by the location information added to such contents.

Note that the location of the house may be explicitly set by the user such as father and mother, or may be obtained on the basis of the location of the smartphone of the user at the point in time when such user provides a content to content management device 100 over a home network (e.g., WiFi and LAN connection). Note that when the location of the user's house changes due to moving, for example, the information held by content management device 100 indicating the house location should be changed accordingly. Note that the house location may be explicitly changed by the user such as father and mother, or may be obtained on the basis of the change in the location of the smartphone of the user at the point in time when such user provides a content to content management device 100 over a home network (e.g., WiFi and LAN connection). To support the change in the house location, content management device 100 manages the location of the previous house in association with time information. For example, content management device 100 manages the location of the previous house in association with time information in the as follows: the home address from January 2000 to December 2002 was AA, Chiyoda Ward, Tokyo, and the home address from January 2003 to December 2013 was BB, Osaka City, Osaka Prefecture.

(a) of FIG. 9 shows a first exemplary criterion. According to the first exemplary criterion, how a content is introduced is determined with reference to the distance between the imaging location and the house. (a) of FIG. 9 shows an exemplary criterion upon which the distances from the imaging locations and the house is classified into the three ranges of close (e.g., 10 kilometers or less), intermediate (e.g., 10 kilometers to 100 kilometers), and far (e.g., 100 kilometers or over), and address representation levels of such ranges are set at "detailed," "intermediate," and "rough," respectively. GPS information added to each of the imaged pictures or moving images may serve as the imaging location, as described above, in making such determination. Note that to set the address representation level at one of "detailed," "intermediate," and "rough" corresponds to setting the area classification of the imaging location at one of "smaller," "intermediate," and "wider."

When this classification is used, the details of the content is displayed for introduction purposes, as shown on the rightmost column in (a) of FIG. 9, by representing the address at one of the levels depending on the distance from the house to the imaging location of the event; when in a close distance, the address is represented by "ward," when in an intermediate distance, the address is represented by "city/town/village," and when in a far distance, the address is represented by "prefecture" or "country."

(b) of FIG. 9 shows a second exemplary criterion. According to the second criterion, the address representation level is determined in consideration of the name recognition of a city visited, or the number of times such city has been visited, in addition to the distance from the house to an event imaging point, which is considered in the first criterion. Six levels can be set as the address representation levels: from "1 (most detailed)" through "6 (roughest)." When a city is in a distant location with low name recognition, for example, its prefectural name or country name can be used as an event imaging point. Meanwhile, when a place is in proximity that has been visited many times, its ward name, town name, or landmark name (e.g., the name of a park) can be used as an event imaging point.

When an event imaging point is in a country different from the one where the house is located (overseas), a criterion upon which a determination as to address representation is made may not depend on the distance from the house, and thus the address may be represented by the country name, or the city name, if the name recognition of such city is high.

Content management device 100 holds the criterion table shown in (a) or (b) of FIG. 9 in storage 103. When editing a content, computation unit 101 determines how to display the content for introduction purposes on the basis of additional information of the content and the criterion table shown in (a) or (b) of FIG. 9.

Figure 10:
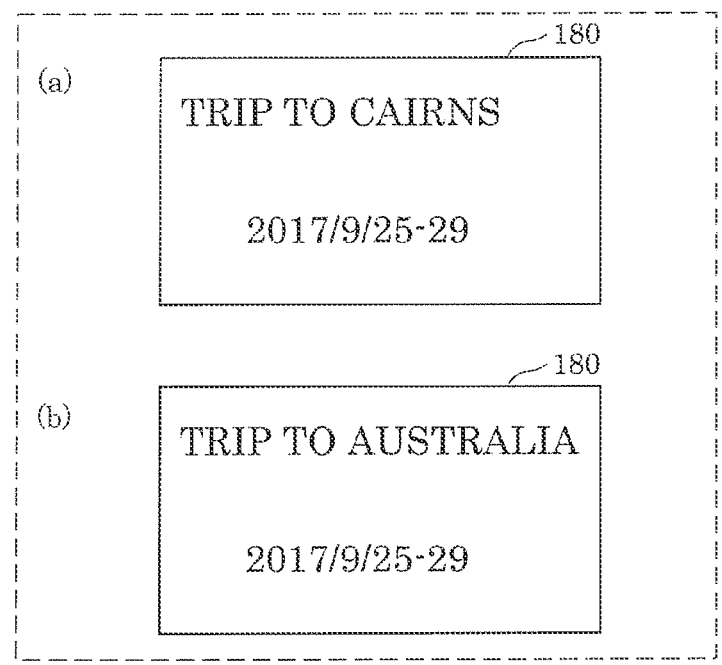
FIG. 10 is a diagram that illustrates an example of displaying an opening caption according to Embodiment 2.

FIG. 10 shows an exemplary opening caption indicating a content, which is a digest version moving image created by editing a plurality of pictures imaged during a family trip to Cairns in Australia. Such opening caption is displayed, for example, on TV 180.

Computation unit 101 determines that the imaging location of the contents is in a far distance from the house (100 kilometers or over) from the GPS information indicating the imaging location added to such contents such as pictures or moving images imaged by the owner using smartphone 110 during the family trip. Computation unit 101 then determines that "prefecture" or "country" is to be used on the opening page to display these contents, from the criterion table of (a) of FIG. 9 recorded in storage 103. Consequently, computation unit 101 determines that the imaging location is represented by "Australia" from the GPS information, and displays it as shown in (b) of FIG. 10.

Other information can be utilized in determining address representation, in addition to information added to contents. Here, an example case will be described in which the representation of an opening caption is determined in accordance with "name recognition," in addition to "distance from house."

Computation unit 101 of content management device 100 takes statistics of the trip destinations of the family from the contents and their additional information recorded in storage 103, counts the number of times the respective trip destinations have been visited, and stores the results in storage 103. When determining that the number of visits is a specified or greater number of times, computation unit 101 concludes that the name recognition of such trip destination is high. Computation unit 101 determines the representation of an opening caption from the table shown in (b) of FIG. 9, on the basis of the name recognition and the distance from the house indicated by the additional information of the contents.

Computation unit 101 concludes that an imaging location has been visited many times, on the basis of GPS information and imaging date information added to the contents recorded in storage 103, such as a plurality of pictures and moving images, when determining that plural collections of contents are present that were imaged in the same imaging location but on different dates.

Subsequently, computation unit 101 concludes, from (b) of FIG. 9, that the distance from the house to the imaging location of this family trip is "far distance" and "name recognition/number of visits is high," and thus determines that the representation level "3 (slightly detailed)" is to be used. More specifically, computation unit 101 determines that any one of "city/town/village, or prefecture, and county" is to be used. As a result, computation unit 101 causes a collection of contents with an opening caption shown (a) of FIG. 10 to be outputted to TV 180. In (b) of FIG. 10, the geographical name "Cairns" is displayed, which is a smaller area classification and more expressive of locality, instead of the country name "Australia."

2-3. Effect, etc.

The present embodiment operates in the following manner: when computation unit 101 of content management device 100 creates a display screen of a content that relates to a distant location from the house or a content that relates to a visit to a foreign country, on the basis of information added to the content such as pictures and moving images, the present embodiment achieves an easy-to-understand address representation when the owner, a user, or a viewer views such content (here, the name of a famous city, or a country name). Stated differently, computation unit 101 is capable of performing a process that avoids the use of a difficult-to-understand expression or an unfamiliar area name of the imaging location of the content, such as "Parramatta Park" and "Mulgrave Road," thereby creating and displaying an opening caption that includes easy-to-understand geographical name information.

Embodiment 3

The content management device according to the present invention is capable of appropriately switching speech instructions to be given by an operator and videos to be displayed, in accordance with a dialogue with the operator, thereby enabling the operator to naturally say the words for operating the content management device without having to think about what to say. More specifically, the present embodiment operates in the following manner: accepts an input of an operator's voice to subject it to voice recognition; converts the recognized voice into an operation signal; identifies videos, being a plurality of contents, on the basis of the operation signal; allocating the identified videos into a group; displays a screen that shows, on a group basis, speech instructions for collectively operating the videos belonging to such group; uses the voice inputted from the operator for voice recognition to identify attribute information on the operator previously recorded: selects a speech instruction to be displayed on the basis of such attribute information; and displays the selected speech instruction on the screen.

Note that the above contents may be contents managed by the content management device according to one of Embodiment 1 and Embodiment 2, or may be any other contents.

The following describes an example with reference to drawings.

3-1. Configuration

The following describes content management device 100 according to the present embodiment.

Figure 11A:
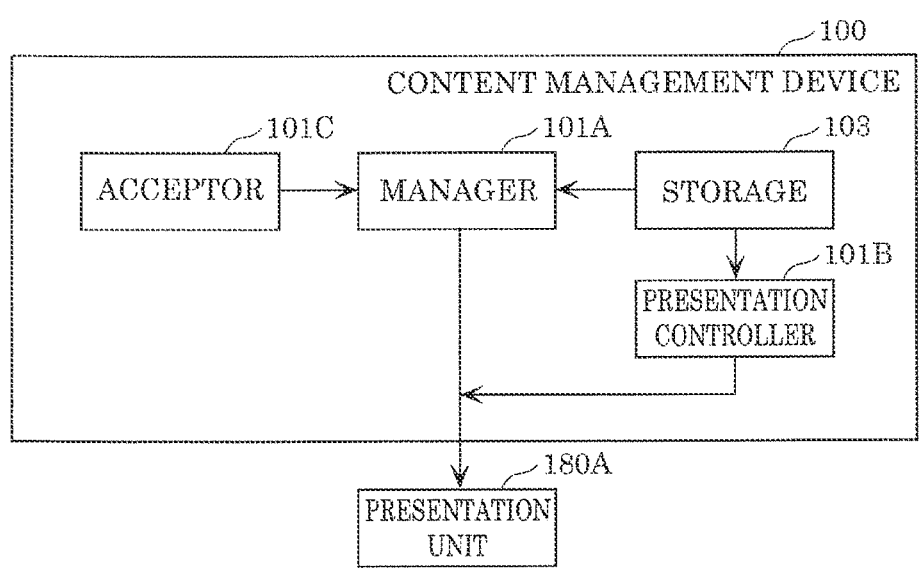
FIG. 11A is a diagram that illustrates the configuration of a content management device according to Embodiment 3.

As shown in FIG. 11A, content management device 100 according to the present embodiment includes storage 103, presentation controller 101B, acceptor 101C, and manager 101A. Manager 101A, presentation controller 101B, and acceptor 101C are implemented, for example, by computation unit 101 according to Embodiment 1 executing a predetermined program by use of a processor. I/F 102 can also be used for the implementation of acceptor 101C. Content management device 100 is connected to presentation unit 180A that corresponds to TV 180 according to Embodiment 1. Note that content management device 100 may include presentation unit 180A.

Storage 103 stores a plurality of contents and at least one tag that is associated with each of the plurality of contents. A tag is additional information on the contents, examples of which include imaging dates/times, imaging locations (GPS information, geographical name information), information to identify a subject, information on facial expressions of the subject (the degree of smile, the degree of opening/closing of the eyes, and the degree of opening/closing of the mouth), the name of a nearby landmark, information on the temperature, humidity, weather of the imaging location, etc.

Presentation controller 101B causes presentation unit 180A to present at least one tag associated with a targeted content of a search among the plurality of contents Acceptor 101C accepts a user operation on the at least one tag caused to be presented by presentation controller 101B.

Manager 101A causes presentation unit 180A to present at least one tag associated with at least one content serving as a new target of the search when acceptor 101C has accepted the operation. Here, the at least one content is retrieved by the search of the plurality of contents with details of a targeted tag used as a search criterion, and the targeted tag is a target of the operation.

Here, when the number of at least one content caused to be presented by presentation unit 180A is a predetermined or smaller number, manager 101A causes presentation unit 180A to present information for accepting an operation for content playback. The presentation of the information for accepting an operation for content playback is, for example, to display on TV 180 an image of a button for accepting an operation for content playback.

Also, when the number of search criteria concerning at least one content caused to be presented by presentation unit 180A is a predetermined or greater number, manager 101A further causes presentation unit 180A to present information for accepting an operation to reduce the number of search criteria. The presentation of the information for reducing the number of search criteria is, for example, to display on TV 180 an image of a button for accepting an operation to reduce the number of search criteria.

FIG. 11B is a flowchart of a control method for use in content management device 100 according to the present embodiment.

In step S301, as shown in FIG. 11B, manager 101A refers to storage 103 that stores a plurality of contents and at least one tag associated with each of the plurality of contents to cause presentation unit 180A to present at least one tag associated with a targeted content of a search among the plurality of contents.

In step S302, acceptor 101C accepts a user operation on the at least one tag presented in step S301.

In step S303, presentation unit 180A is caused to present at least one tag associated with at least one content serving as a new target of the search when the operation has been accepted. Here, the at least one content is retrieved by the search of the plurality of contents with details of a targeted tag used as a search criterion, and the targeted tag is a target of the operation.

The following describes in detail content management device 100.

FIG. 1 is used to describe the configuration of the present embodiment. The following omits the descriptions of the structural components already described above.

Content management device 100 according to the present embodiment has a voice recognition function, in addition to the functions of content management device 100 according to Embodiment 1 and Embodiment 2. Storage 103 manages contents inputted from father's smartphone 110, mother's smartphone 120, or family camera 130, such as videos, musical contents, and documents held by the respective terminal devices. Storage 103 also records plural pieces of voice data of father or mother. Computation unit 101 matches the voice inputted via microphone 170 with the recorded speech, thereby performing a voice recognition process. Storage 103 also records attribute information on father, mother, or the family. When identifying a speaker (operator) through the voice recognition process, computation unit 101 also identifies the attribute information on such speaker.

Computation unit 101 analyzes videos and the tags added to such videos recorded in storage 103 to allocate related videos into a group. Computation unit 101 then creates an operation screen used to select videos on a group basis, and outputs it onto TV 180 via input-output unit 104. A speech instruction to be given by the speaker (operator) is displayed on a category basis on the operation screen used for selection.

An icon is displayed on the operation screen for each category that includes a plurality of contents grouped on the basis of tag information. Shown in each icon is the category name to be given as a speech instruction and the number of contents that belong to the group of such category.

When the speaker (operator) says the category name shown in the icon selected, while looking at the screen of TV 180, the contents grouped in such category are further divided into groups of a plurality of categories. Then, an icon is displayed that shows the number of contents that belong to each category, and its category name.

3-2. Operation

Content management device 100 has a function of voice-activated operations for controlling various operations by accepting voice instructions. Computation unit 101 matches a voice signal inputted through microphone 170 and I/F 102 with voice data recorded in storage 103, and converts the voice signal into a corresponding operation signal.

(a) of FIG. 11C shows an exemplary operation screen which is displayed on TV 180 when content management device 100 starts up and via which content management device 100 is operated by voice. When the operator says "Panasonic" into microphone 170, for example, the voice "Panasonic" is inputted through microphone 170, and recognized as a startup word (in this case "Panasonic") previously registered. Consequently, the operation screen shown in (a) of FIG. 11C is displayed on TV 180. When content management device 100 starts up in response to the voice as in this case, an operation screen that displays a graphical user interface (GUI) suited to voice-activated operations is displayed, but when content management device 100 starts up in response to a remote control, a GUI suited to conventional remote control operations may be displayed.

The present embodiment describes an example in which storage 103 stores voice data and computation unit 101 performs voice recognition, but content management device 100 may transmit over Internet 160 an input voice signal to a server (not illustrated) connected so that such server performs voice recognition and returns the recognition result to content management device 100.

Content management device 100 collectively stores individual contents of the family, which are an enormous amount of videos. For this reason, a display format by use of a GUI provides poor viewability because a content is selected from those displayed on TV 180 in accordance with dates or imaging locations in a hierarchical and all-inclusive form. The present embodiment presents recommended contents as branches (categories), each of which is grouped as related pictures or moving images under predetermined conditions. To present recommended contents in the above manner, content management device 100 analyzes videos or the tags of videos previously recorded in storage 103, groups contents that are determined as highly related contents from the analysis of the tags of the videos or each scene in the videos, and displays such contents as a group in the form of an icon on the tip of a branch.

To enhance the visibility of the display, the number of categories that are simultaneously displayed on the screen of TV 180 is automatically adjusted to fall within five to nine kinds of categories. Icons are created for the respective categories to be displayed in a branched form. The present embodiment automatically selects and determines categories as follows: time-based category ("the year 2017," "recent daddy): imaging location-based category ("Hirakata Park," "Osaka City"); subject-based category ("Taro," the eldest son in the family, "group photo," a collection of videos in which a plurality of persons are together); and others.

As shown in (a) of FIG. 11C, content management device 100 according to the present embodiment places a microphone-like icon (hereinafter also referred to as "microphone" icon) 1101 at the center of the screen of TV 180, and displays message 1108 saying "say search keyword" as an instruction that prompts for a user operation. Such display notifies the user of that any keywords is acceptable and that content management device 100 is waiting for a voice-activated operation command from the user.

When no operation has been accepted for a predetermined time length with such screen being displayed, computation unit 101 displays the screen, as shown in (b) of FIG. 11C, on which recommended contents are located around "microphone" icon 1101 on a category basis, and branches extend toward the icons of the respective categories from "microphone" icon 1101.

(b) of FIG. 11C shows a state in which content management device 100 displays on the screen of TV 180 the following icons around "microphone" icon 1101: "the year 2017" icon 1102, "Taro" icon 1103, "Hirakata Park" icon 1104, "Osaka City" icon 1105, "group photo" icon 1106, and "recent daddy" icon 1107. Each of these icons indicates the corresponding category name (e.g., "the year 2017," "Taro," etc.) and the number of contents belonging to such category. For example, "the year 2017" icon 1102 indicates that 759 pictures or moving images are present.

As described above, content management device 100 displays the categories of contents and the number of contents belonging to such categories in an easy-to-understand manner. Also, recommended categories that are automatically created and displayed in the above manner enables to avoid the trouble of not knowing what to say, which is likely to happen in voice-activated operations. As described above, computation unit 101 of content management device 100 analyzes the contents recorded in storage 103, and creates and displays on TV 180 a screen that shows the result of the analysis to the user or the operator in an easy-to-understand manner.

In (b) of FIG. 11C, branches extend radially from "microphone" icon 1101 that prompts for a voice input, and six icons are displayed at the tips of the respective branches to indicate the category names and the number of contents included in the respective categories. Further displayed at a lower part of the screen is message 1108 saying "say search keyword" that prompts for an operation instruction. This enables the operator to understand that a category name is selectable by voice.

Figure 12:
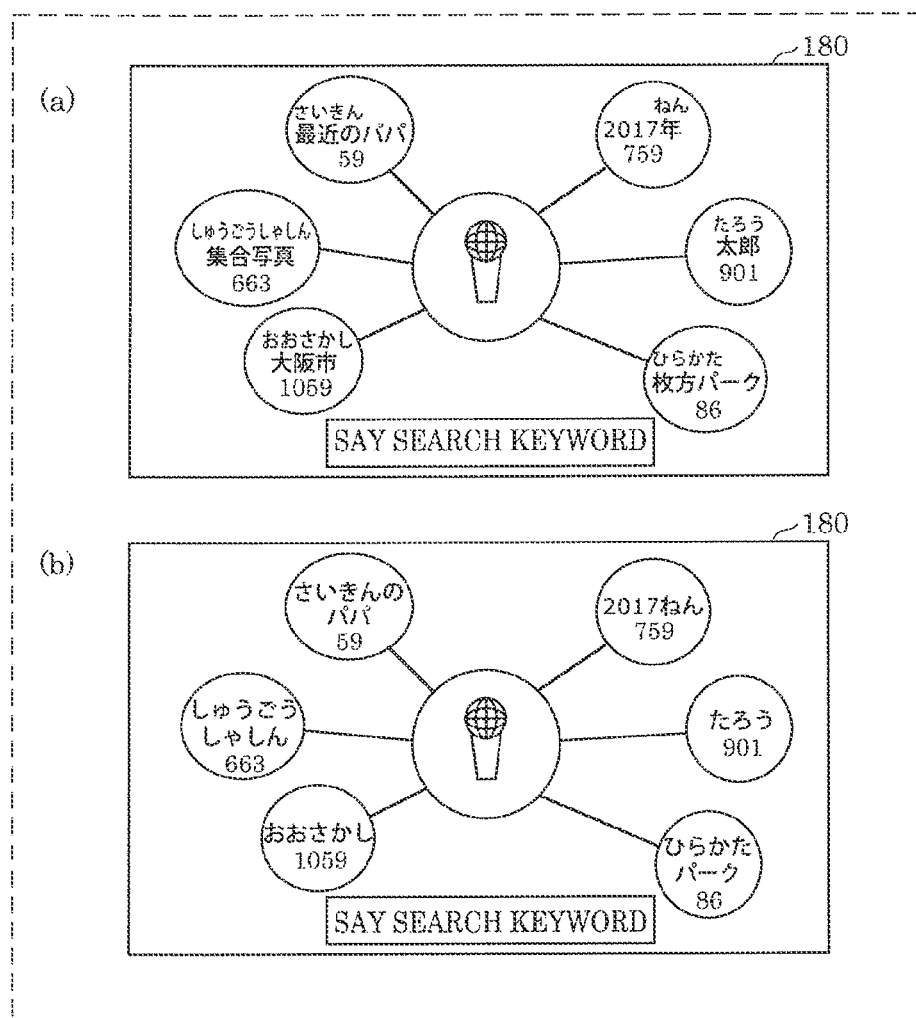
FIG. 12 is a diagram that illustrates a second example of displaying an operation screen according to Embodiment 3.

(a) of FIG. 12 shows an example in which hiragana characters (rubies) are additionally displayed to the icons representing category names in difficult-to-read kanji characters, in addition to displaying the six recommended icons shown in (b) of FIG. 11C. Recent voice recognition technology is capable of identifying a speaker from the vocal print of such speaker, and estimating attributes of the speaker with high accuracy, such as gender or age. Examples of speaker identification technology include the technologies described in PTL 2 and PTL 3.

Family information such as "face photos" of all of the family members for face verification purposes, "names" of the family members, "nicknames" among family members, "birth dates," etc., if recorded in storage 103 of content management device 100, enables computation unit 101 to know from the recorded information the age of a child in the family, and thus to add rubies appropriate for the age of such child to category names. Computation unit 101 may also add rubies, for example, only when estimating by use of a voice recognition technology that such speaker is a child from the voice inputted by the speaker through microphone 170, thereby displaying category names that are suitable for both adults and children.

When being able to determine from the voice of a speaker and the state of the speech that a child is the only operator or viewer, computation unit 101 is also capable of reducing the use of kanji characters for display, as shown in (b) of FIG. 12, without adding rubies to the kanji characters representing category names. Stated differently, computation unit 101 in this case is capable of selecting and displaying category names represented by a reduced number of kanji characters.

The representation of category names in one of kanji characters, a combination of kanji characters and rubies (hiragana characters showing the reading of kanji), and hiragana characters may be selected by estimating the speaker's reading ability of kanji from the birth date information registered in content management device 100 or the result of speaker estimation. Also, depending on the age, the overseas travel history, and the language ability of a viewer or a speaker, the English word "Cairns" may be used to represent the city name without displaying it in katakana characters, or katakana characters may be added above the English word.

Figure 13:
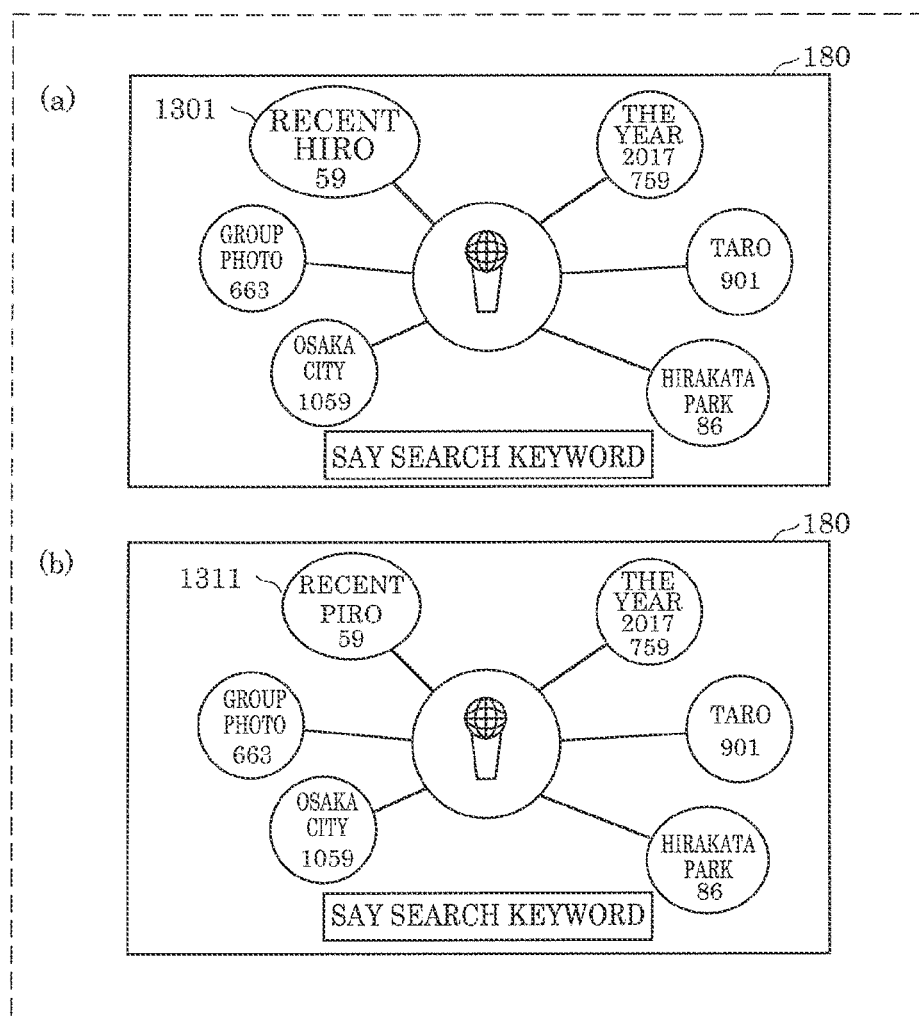
FIG. 13 is a diagram that illustrates a third example of displaying an operation screen according to Embodiment 3.

FIG. 13 shows an exemplary operation screen displayed on TV 180 when the parents of the owner perform voice-activated operations on content management device 100. (a) of FIG. 13 shows an exemplary display for the family of the owner who lives with the parents.

When the parents of the owner of content management device 100 wish to view pictures, it is natural for them to use the name of their son ("Hiro"), which is the owner's name, and say "let us view the recent pictures of Hiro," without saying "let us view the pictures of daddy." When having identified by use of a voice recognition technology the speaker from the voice inputted from microphone 170, and estimated that the current speakers (operators) are the parents of the owner, computation unit 101 changes the category names of the icons so that the parents can speak easily. (a) of FIG. 13 uses the name of the speakers' son as a category name to show "recent Hiro" icon 1301. In addition, when determining that the parents, being the speakers, are elderly persons from the age information on the parents recorded in storage 103, computation unit 101 increases the size of category name representation compared to normal cases to display the screen that helps the speakers to speak easily.

(b) of FIG. 13 shows another exemplary operation screen, on which the target category name to be given as an instruction is displayed in accordance with a family nickname. When the current speaker (operator) has been estimated as a child of the owner by a voice recognition technology, and it has been identified from the family information that the child calls father "Piro," "recent Piro" icon 1311 may be displayed that is an icon in which the expression "recent Piro" is displayed, instead of "recent daddy," as the category name of a collection of recent videos of father.

3-3. Effect, etc.

As described above, content management device 100 identifies a speaker from an input voice, selects a form of representation (or a word) that is easy to say on the basis of information on the speaker, and displays the selected representation in a manner that the speaker can speak easily. This configuration enables the speaker to speak easily without having no difficulty in performing voice-activated operations.

3-4. Variation of Embodiment 3

Figure 14:
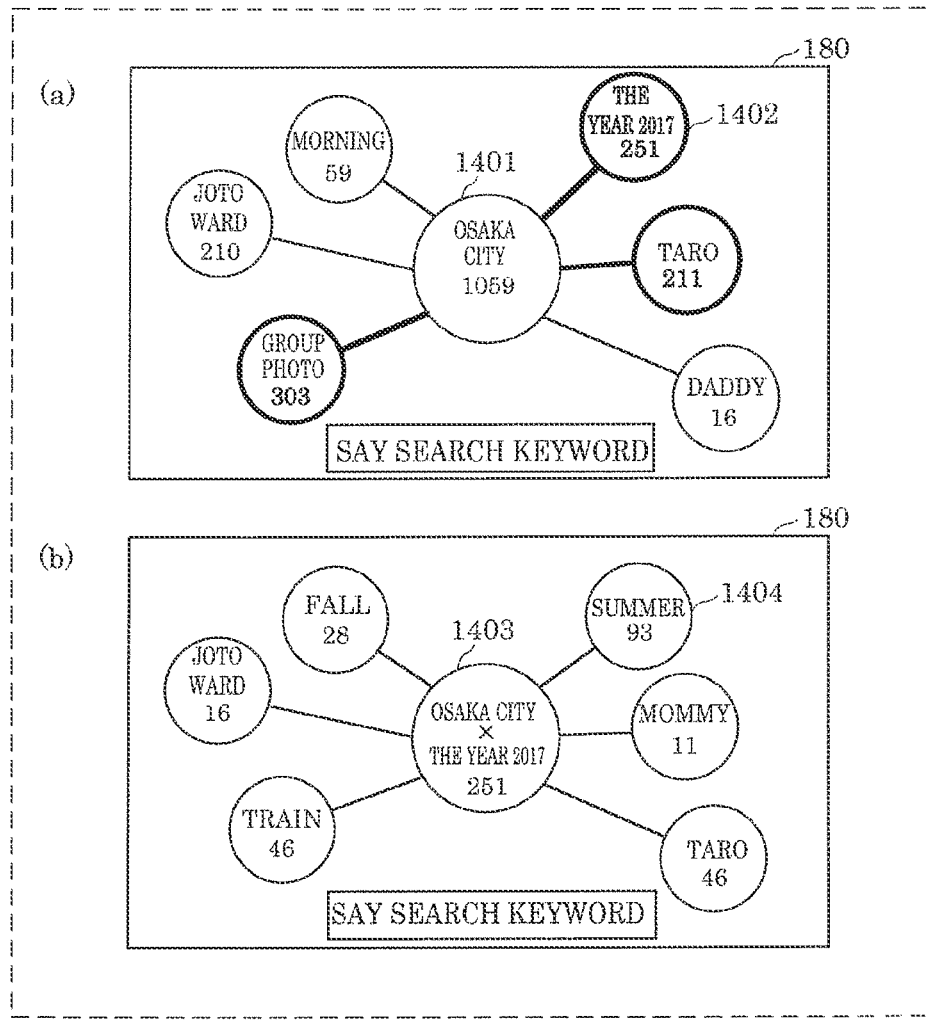
FIG. 14 is a diagram that illustrates a fourth example of displaying an operation screen according to a variation of Embodiment 3.

FIG. 14 is a diagram that illustrates how screen displays are switched in response to a selection by a voice-activated operation.

When "Osaka City" icon 1105 is selected on the operation screen in (b) of FIG. 11C, the screen is animated to switch to a display as shown in (a) of FIG. 14. In (a) of FIG. 14, 1059 contents that are divided into six categories are located around "Osaka City" icon 1401, which indicates that 1059 contents relating to "Osaka City" are present. Each of such categories is further divided into a layer to be represented as a branch. For example, to show that a total number of contents imaged in "the year 2017" is 251 among the 1059 contents imaged in "Osaka City," "the year 2017" icon 1402 is represented together with the number of contents "251" in (a) of FIG. 14.

As described above, a GUI is employed that enables the specification of contents by a search keyword for each category layer so that the user can reach a targeted content easily and quickly. The icon of the already specified categories is displayed at the center, from which branches extend to display icons of further divided categories.

(b) of FIG. 14 shows a screen of TV 180 that is displayed as a result of "the year 2017" icon 1402 having been selected on (a) of FIG. 14. Icon 1403 is located at the center of the screen to represent "Osaka City" and "the year 2017," which are the current keywords for specification, and further a total number of contents (251). Branches that extend from the center display the automatically selected category icons that further divide 251 contents effectively. In (b) of FIG. 14, the contents are divided into six categories. For example, "summer" icon 1404 at the upper right indicates that 93 contents belong to the category "summer." Stated differently, 93 contents are applicable among all the contents originally managed by content management device 100 when grouped and specified by "Osaka City," which is a keyword concerning places, "the year 2017," which is a keyword concerning imaging periods, and "summer," which is a keyword indicating a further detailed period.

As described above, the selection of a category name to be given as an instruction shown on an icon that is displayed on the operation screen on the screen of TV 180 further divides the icons belonging to such selected icon into a plurality of categories. Then, the number of contents belonging to each of such categories is counted, and icons are displayed on TV 180 that represent the category names and the number of contents included in the respective categories. Computation unit 101 determines as appropriate the number of contents to be displayed on the operation screen on the basis of the contents or the information added to the contents, and displays the determined number of contents on TV 180. This enables the speaker to quickly narrow down the contents to specify the targeted content simply by saying the category name indicated by an icon.

The following describes an operation to be performed when the narrowing down of the contents progresses after giving search words for a few times through voice-activated operations, and computation unit 101 determines that the content the speaker wishes to view has been specified. When the number of contents included in the category selected by the user is less than a specified number (e.g., when the number of contents is less than 300, and when the number of contents that belong to each category serving as a branch is less than 100, etc.), computation unit 101 displays an icon that is different from icons indicating categories on an operation screen on TV 180.

Figure 15:
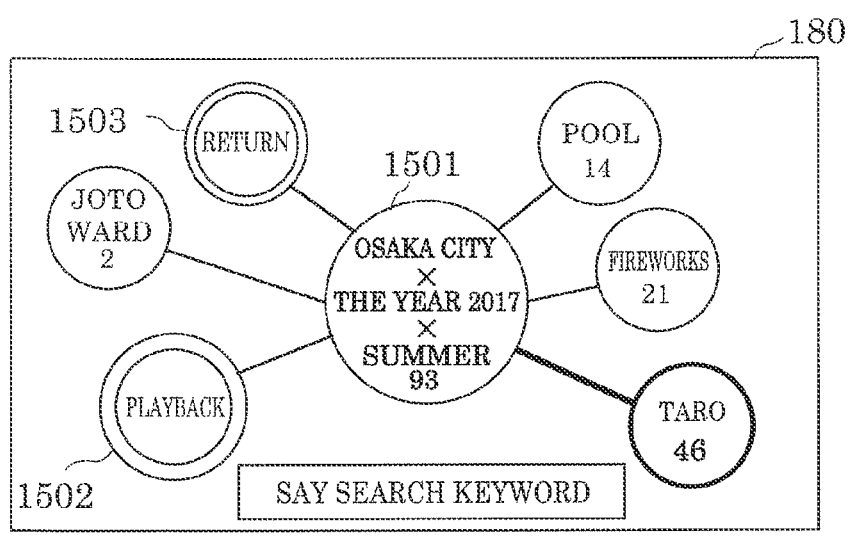
FIG. 15 is a diagram that illustrates a fifth example of displaying an operation screen according to the variation of Embodiment 3.

FIG. 15 shows an operation screen to be displayed when the speaker has selected "summer" icon 1404 from the operation screen on TV 180 shown in (b) of FIG. 14 and said the category name. The icon at the center of the screen represents that the number of contents narrowed down by the speaker by the categories of "Osaka City," "the year 2017," and "summer" is 93. When the operator has selected an icon that indicates the number of categories belonging to the icon less than a specified number (300 contents in the present embodiment), computation unit 101 displays on the operation screen a command icon in addition to category icons relating to contents. The operator has said the category name "summer" from the operation screen of (b) of FIG. 14, as a result of which computation unit 101 recognizes through a voice recognition process that the operator has selected "summer" icon 1402 to which less than 300 icons belong. Consequently, computation unit 101 displays, as shown in FIG. 15, the four icons, "pool," "firework," "Joto Ward," and "Taro", as well as control commands, "playback" icon 1502 and "return" icon 1503. Different from other icons, the operation names of "playback" icon 1502 and "return" icon 1503 are represented in double circles for visual recognizability of the operator.

Icons displayed here are simply required to serve as auxiliary information used by the operator in voice-activated operations. Such icons does not necessarily have to indicate grouped category names of the stored contents, and thus may indicate the names of operations that the operator is likely to perform next (potentially intended control). When the speaker says "playback" on the display screen on TV 180 shown in FIG. 15, computation unit 101 controls the structural components of content management device 100 in order to start the playback of 93 contents relating to "Osaka City," "the year 2017," and "summer" included in the currently selected icon 1501, as a result of which videos, etc. are outputted onto TV 180.

As described above, in collectively managing an enormous number of individual contents, a user interface, through which contents are narrowed down by free keywords given by voice, enables to reach a desired content intuitively in a short period of time (through a reduced number of steps), instead of conventional, hierarchical, or all-inclusive user interfaces such as remote control, mouse, and touch-based GUI. By identifying or estimating such viewer or operator, a screen display can be updated in accordance with attribute information of such person, such as the age (knowledge) of such person, or how such person is represented (nickname). This provides a user with a natural and comfortable use of content management device 100.

Note that one or more or all parts of the above-described embodiments can be described as additional remarks below, but the present disclosure is not limited to the following descriptions.

Additional Remark 1

A content management method of storing videos from a plurality of imaging devices, the method comprising:

obtaining time information on imaging times of the videos;

obtaining location information on imaging locations of the videos; and identifying ones of the videos, imaging times of which have a time difference within a predetermined time on the basis of the time information and imaging locations of which are within a predetermined distance on the basis of the location information, and allocating the identified videos into a group, wherein the videos belonging to the group are managed.

Additional Remark 2

A content management method of storing videos from a plurality of imaging devices, the method comprising:

obtaining, from first videos imaged by a first imaging device among the videos, first time information on imaging times of the first videos;

obtaining, from second videos imaged by a second imaging device among the videos, second time information on imaging times of the second videos; and identifying ones of the first videos having the first time information on the basis of the second time information obtained from the second videos, and allocating the identified ones of the first videos into a group, the ones of the first videos having been imaged within a predetermined time, wherein the videos that belong to the group are managed.

Additional Remark 3

A content management method of storing videos from a plurality of imaging devices, the method comprising:

obtaining, from first videos imaged by a first imaging device among the videos, first location information on imaging locations of the first videos;

obtaining, from second videos imaged by a second imaging device among the videos, second location information on imaging locations of the second videos; and identifying ones of the first videos having the first location information on the basis of the second location information obtained from the second videos, and allocating the identified ones of the first videos into a group, the ones of the first videos having been imaged within a predetermined distance, wherein the videos that belong to the group are managed.

Additional Remark 4

A content management method of storing videos from a plurality of imaging devices, the method comprising:

obtaining, from first videos imaged by a first imaging device among the videos, first time information on imaging times of the first videos;

obtaining, from second videos imaged by a second imaging device among the videos, second time information on imaging times of the second videos;

inputting distance information on a distance between the first imaging device and the second imaging device; and identifying ones of the first videos having the first time information on the basis of the second time information obtained from the second videos, when the distance information indicates that the first imaging device and the second imaging device were within a predetermined distance, and allocating the identified ones of the first videos into a group, the ones of the first videos having been imaged within a predetermined time, wherein the videos that belong to the group are managed.

Additional Remark 5

A content management device, comprising:

an input unit through which videos from a plurality of imaging devices are inputted;

a storage that stores the videos;

a computation unit that identifies ones of the videos as belonging to a group on the basis of time information and location information on the videos stored in the storage, the ones of the videos being within a predetermined time and having been imaged within a predetermined distance; and an output unit that collectively outputs the videos belonging to the group.

Additional Remark 6

A content management device, comprising:

an input unit through which the following is inputted: first videos imaged by a first imaging device; first time information on imaging times of the first videos; second videos imaged by a second imaging device; and second time information on imaging times of the second videos;

a storage that stores the first videos, the first time information, the second videos, and the second time information;

a computation unit that identifies ones of the first videos having the first time information on the basis of the second time information, and allocating the identified ones of the first videos into a group, the ones of the first videos having been imaged within a predetermined time; and an output unit that collectively outputs the videos belonging to the group.

Additional Remark 7

A content management device, comprising:

an input unit through which the following is inputted: first videos imaged by a first imaging device; first location information on imaging locations of the first videos; second videos imaged by a second imaging device; and second location information on imaging locations of the second videos;

a storage that stores the first videos, the first location information, the second videos, and the second location information;

a computation unit that identifies ones of the first videos having the first range information on the basis of the second location information, and allocating the identified ones of the first videos into a group, the ones of the first videos having been imaged within a predetermined distance range; and an output unit that collectively outputs the videos belonging to the group.

Additional Remark 8

A content management device, comprising:

an input unit through which the following is inputted: first videos imaged by a first imaging device; first time information on imaging times of the first videos; second videos imaged by a second imaging device; second time information on imaging times of the second videos; and distance information on a distance between the first imaging device and the second imaging device;

a storage that stores the first videos, the first time information, the second videos, the second time information, and the distance information; and a computation unit that identifies ones of the first videos having the first time information on the basis of the second time information obtained from the second videos, when the distance information indicates that the first imaging device and the second imaging device were within a predetermined distance, and allocating the identified ones of the first videos into a group, the ones of the first videos having been imaged within a predetermined time; and an output unit that collectively outputs the videos belonging to the group.

Additional Remark 9

A content display method of selecting and displaying a specified video from videos from a plurality of imaging devices, the method comprising:

obtaining location information on imaging locations of the videos;

identifying ones of the videos that were imaged within a predetermined distance on the basis of the location information, and allocating the identified videos into a group; and creating a display content by collecting the videos belonging to the group, wherein a screen that shows an area name is added to the display content, the area name being selected in accordance with a distance between the location information of the videos belonging to the group and a specified location.

Additional Remark 10

A content display method of selecting and displaying a specified video from videos from a plurality of imaging devices, the method comprising:

obtaining time information on imaging times of the videos;

obtaining location information on imaging locations of the videos; and identifying ones of the videos, imaging times of which have a time difference within a predetermined time on the basis of the time information and imaging locations of which are within a predetermined distance on the basis of the location information, and allocating the identified videos into a group;

wherein a screen that shows an area name is added to the display content, the area name being selected in accordance with a distance between the location information of the videos belonging to the group and a specified location, and the time information.

Additional Remark 11

A content display method of selecting and displaying a specified video from a plurality of videos, the method comprising:

accepting an input of an operator's voice to recognize the voice, and converting the recognized voice into an operation signal;

identifying ones of the plurality of videos on the basis of the operation signal, and allocating the identified videos into a group;

creating a display content on which a category name is displayed on a group basis, the category name serving as a speech instruction to be given to collectively operate the videos belonging to the group; and accepting an input of an operator's voice to recognize the voice, and identifying attribute information on the operator, wherein the category name is determined on the basis of the attribute information.

The embodiments have been described above to show an exemplary technology of the present disclosure, for which the accompanying drawings and detailed descriptions are provided.

To illustrate the above implementation, the structural components illustrated in the accompanying drawings and the embodiments can thus include structural components that are not unessential to solve the issues, in addition to the structural components essential to solve the issues. Therefore, the fact that the unessential structural components are illustrated in the accompanying drawings and the embodiments should not lead to the immediate conclusion that such unessential structural components are essential.

Also note that the above-described embodiments are intended for illustrating the technology of the present disclosure, and thus allow for various modifications, replacement, addition, omission, etc., made thereto within the scope of Claims and its equivalent scope.

INDUSTRIAL APPLICABILITY

The content management device and the content method according to the present invention are applicable for use in a device that utilizes the following capabilities to present to an operator an easy-to-understand and easy-to-utter speech instruction that has been categorized for each of the grouped contents: appropriately detecting a past event of an individual from a plurality of contents recorded, in consideration of privacy or confidentiality; or identifying an operator (speaker) from the voice inputted through a voice-activated operation. In particular, the present disclosure is applicable for use in a device that categorizes and displays, on the basis of attribute information, not only recorded pictures or moving images of an individual, but also a plurality of document files such as dissertations/theses, novels, and newspapers, or news show contents in a manner that facilitates a user selection.

REFERENCE MARKS IN THE DRAWINGS 1 content management system
100 content management device
101 computation unit
101A manager
101B presentation controller
101C acceptor
102 I/F
103 storage
104 input-output unit
110, 120, 190 smartphone
111, 121, 140 content
130 camera
140 recording card
150 router
160 Internet
170 microphone
180 TV
180A presentation unit
1101, 1102, 1103, 1104, 1105, 1106, 1107, 1301, 1311, 1401, 1402, 1403, 1404, 1501, 1502, 1503 icon
1108 message

The invention claimed is:

1. A content management device, comprising:
a storage that stores a plurality of contents, and an imaging location of each of the plurality of contents; and
a manager that originally determines a character string indicating a geographical area concerning the plurality of contents without human involvement,
wherein the manager categorizes the plurality of contents into at least three different groups based on the imaging location included in each content of the plurality of contents,
wherein a first group includes content having an imaging location that is a first distance range from a predetermined location of the content management device, a second group includes content having an imaging location that is a second distance range from the predetermined location of the content management device, and the third group includes content having an imaging location that is a third distance range from the predetermined location of the content management device,
wherein the second distance range is greater than the first distance range and the third distance range is greater than the second distance range,
wherein the manager determines a first character string related to the first group, a second character string related to the second group, and a third character string related to the third group,
wherein the second character string indicates a wider geographical area than a geographical area indicated by the first character string,
wherein the third character string indicates a wider geographical area than a geographical area indicated by the second character string,
wherein the content management device further displays one character string on a display device as an opening caption of a video including the plurality of contents, the opening caption being a first shown content of the video, and
wherein the one character string is selected from the group consisting of the first character string related to the first group, the second character string related to the second group, and the third character string related to the third group determined by the manager originally without human involvement.

2. The content management device according to claim 1, wherein the manager further categorizes each of the at least three different groups into at least a first sub-category and a second sub-category, each sub-category being indicative of a number of times the imaging location has been visited, and
wherein the first sub-category indicates the imaging location being visited a fewer number of times than the second sub-category.

3. A control method for use in a content management device, the control method comprising:
originally obtaining a plurality of contents and an imaging location of each of the plurality of contents from a storage that stores the plurality of contents and the imaging location of each of the plurality of contents without human involvement; and
determining a character string indicating a geographical area concerning the plurality of contents,
categorizing the plurality of contents into at least three different groups based on the imaging location included in each content of the plurality of contents,
wherein a first group includes content having an imaging location that is a first distance range from a predetermined location of the content management device, a second group includes content having an imaging location that is a second distance range from the predetermined location of the content management device, and the third group includes content having an imaging location that is a third distance range from the predetermined location of the content management device,
wherein the second distance range is greater than the first distance range and the third distance range is greater than the second distance range,
wherein the method comprises determining a first character string related to the first group, a second character string related to the second group, and a third character string related to the third group,
wherein the second character string indicates a wider geographical area than a geographical area indicated by the first character string,
wherein the third character string indicates a wider geographical area than a geographical area indicated by the second character string,
wherein the method further comprises displaying one character string on a display device as an opening caption of a video including the plurality of contents, the opening caption being a first shown content of the video, and
wherein the one character string is selected from the group consisting of the first character string related to the first group, the second character string related to the second group, and the third character string related to the third group determined by the manager originally without human involvement.

4. The control method according to claim 3, further comprises:
further categorizing each of the at least three different groups into at least a first sub-category and a second sub-category, each sub-category being indicative of a number of times the imaging location has been visited, wherein the first sub-category indicates the imaging location being visited a fewer number of times than the second sub-category.

5. A content management system, comprising:
a plurality of terminals; and
the content management device according to claim 1,
wherein the storage in the content management device stores the plurality of contents generated as the plurality of contents by the plurality of terminals.

6. A content management system, comprising:
a plurality of terminals; and
the content management device according to claim 2,
wherein the storage in the content management device stores the plurality of contents generated as the plurality of contents by the plurality of terminals.

7. The content management device according to claim 1, wherein the character string indicating the geographical area concerning the plurality of contents is not determined before the manager determines the character string.

8. The control method according to claim 3, wherein the character string indicating the geographical area concerning the plurality of contents is not determined before the determining the character string.

9. The content management device according to claim 1, wherein the manager determines the character string based on information contained in the plurality of contents.

10. The content method according to claim 3, wherein the manager determines the character string based on information contained in the plurality of contents.

* * * * *